(12) United States Patent
Feidner

(10) Patent No.: US 8,642,871 B2
(45) Date of Patent: Feb. 4, 2014

(54) INSTRUCTIONAL MUSIC READING AND INSTRUMENT PLAYING SYSTEM AND METHOD

(75) Inventor: Erica Vanderlinde Feidner, Wilton, CT (US)

(73) Assignee: Piano Matchmaker LLC, Wilton, CT (US)

( * ) Notice: Subject to any disclaimer, the term of this patent is extended or adjusted under 35 U.S.C. 154(b) by 74 days.

(21) Appl. No.: 13/130,926

(22) PCT Filed: Nov. 24, 2009

(86) PCT No.: PCT/US2009/006291
§ 371 (c)(1),
(2), (4) Date: Aug. 9, 2011

(87) PCT Pub. No.: WO2010/059254
PCT Pub. Date: May 27, 2010

(65) Prior Publication Data
US 2012/0135789 A1   May 31, 2012

Related U.S. Application Data

(60) Provisional application No. 61/225,598, filed on Jul. 15, 2009, provisional application No. 61/117,411, filed on Nov. 24, 2008.

(51) Int. Cl.
*G09B 15/00* (2006.01)
*A63F 9/24* (2006.01)
*A63F 13/00* (2006.01)
*G06F 17/00* (2006.01)

(52) U.S. Cl.
USPC ............ 84/478; 84/453; 84/470 R; 84/477 R; 463/7; 463/23; 463/30; 463/31; 463/35; 463/36; 463/37

(58) Field of Classification Search
USPC .................. 463/7, 23, 30–31, 35–37; 84/453, 84/470 R, 477 R, 478
See application file for complete search history.

(56) References Cited

U.S. PATENT DOCUMENTS

| | | | |
|---|---|---|---|
| 1,844,976 | A | 2/1932 | Rantz |
| 5,574,238 | A | 11/1996 | Mencher |
| 7,174,510 | B2 | 2/2007 | Salter |
| 7,521,619 | B2 | 4/2009 | Salter |
| 7,739,595 | B2 | 6/2010 | Salter |
| 7,777,117 | B2 | 8/2010 | Salter |
| 7,799,984 | B2 | 9/2010 | Salter |
| 2002/0050206 | A1 | 5/2002 | MacCutcheon |
| 2002/0137566 | A1* | 9/2002 | Tomizawa et al. .............. 463/46 |

(Continued)

*Primary Examiner* — Werner Garner
(74) *Attorney, Agent, or Firm* — IM IP Law PLLC; C. Andrew Im

(57) ABSTRACT

A system and method is provided for instructing students and players to read music notation and to play an instrument. The method includes presenting an interactive display including a graphical representation of at least a portion of a musical instrument and a plurality of lines having spaces therebetween. The plurality of lines and spaces represent a staff of musical notation. The method includes associating the lines and spaces with placement of at least one of a student's fingers to the instrument. The method further includes presenting, on the interactive display, a musical score including a plurality of notes by streaming each of the notes on one of the lines and spaces such that when each of the notes meets a portion of the graphical representation of the musical instrument the student, in response, manipulates a corresponding one of their fingers to play the instrument.

18 Claims, 41 Drawing Sheets

(56) References Cited

U.S. PATENT DOCUMENTS

| | | |
|---|---|---|
| 2003/0167902 A1 | 9/2003 | Hiner et al. |
| 2004/0137984 A1 | 7/2004 | Salter |
| 2006/0204941 A1* | 9/2006 | Kogo .................. 434/307 A |
| 2007/0256540 A1* | 11/2007 | Salter .................. 84/485 R |
| 2010/0009746 A1* | 1/2010 | Raymond et al. ........ 463/31 |
| 2010/0242709 A1 | 9/2010 | Salter |

* cited by examiner

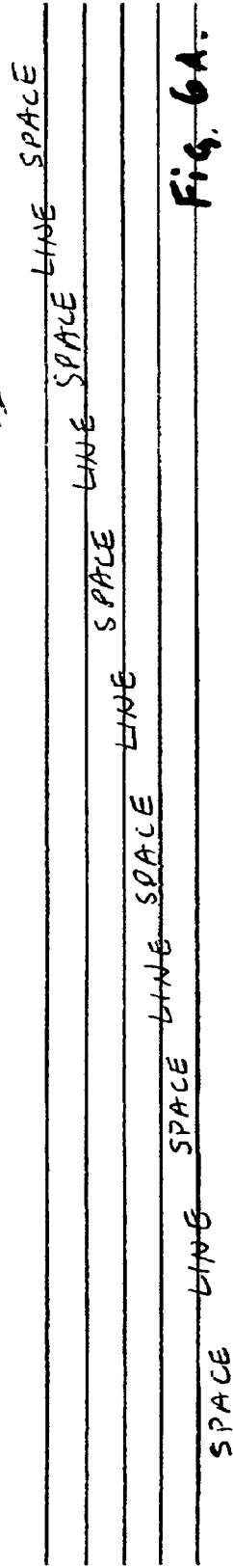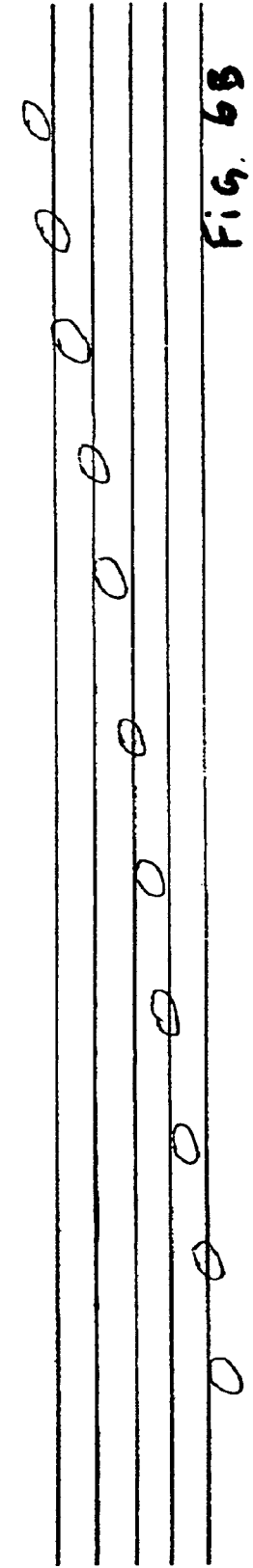

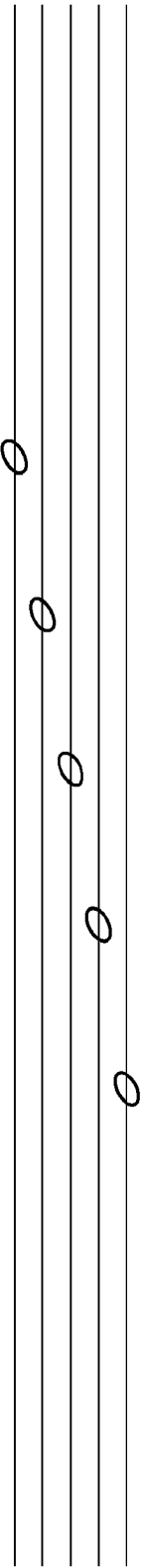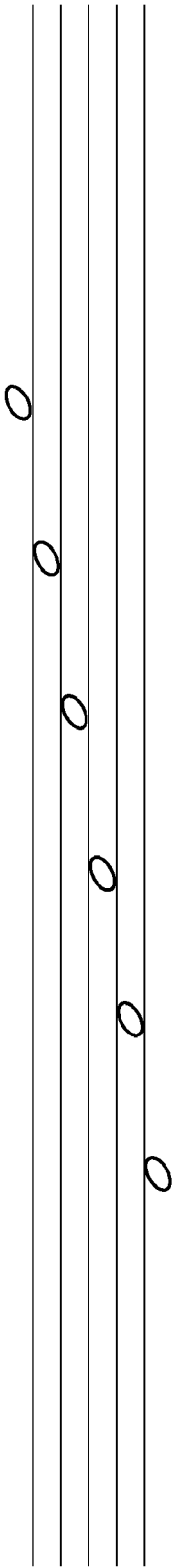
FIG. 7

INSTRUCTIONAL MUSIC READING AND INSTRUMENT PLAYING SYSTEM AND METHOD

CROSS-REFERENCE TO RELATED APPLICATIONS

This patent application claims priority benefit under 35 U.S.C. §119(e) of copending, U.S. Provisional Patent Applications, Ser. Nos. 61/117,411, filed Nov. 24, 2008, and 61/225,598, filed Jul. 17, 2009, the disclosures of these U.S. patent applications are incorporated by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates generally to systems and methods for interactive instruction and, in particular, to systems and methods for instructing students in music score reading and instrument playing.

2. Description of Related Art

Generally speaking, modern music notation originated in European classical music and is now used by musicians of many different genres throughout the world. The system uses a five-line staff. Pitch is shown by placement of notes on the staff (sometimes modified by accidentals), and duration is shown with different note values and additional symbols such as dots and ties. Notation is read from left to right, which makes setting music for right-to-left scripts difficult.

A staff of written music generally begins with a clef, which indicates the particular range of pitches encompassed by the staff. Notes representing a pitch outside of the scope of the five line staff can be represented using ledger lines, which provide a single note with additional lines and spaces. Following the clef, the key signature on a staff indicates the key of the piece by specifying certain notes to be flat or sharp throughout the piece, unless otherwise indicated. Following the key signature is the time signature. Measures (bars) divide the piece into groups of beats, and the time signatures specify those groupings.

Directions to the player regarding matters such as tempo and dynamics are added above or below the staff. For vocal music, lyrics are written. For short pauses (e.g., breaths), retakes presented as a hyphen (-) are added. In music for ensembles, a musical "score" shows music for all players together, while "parts" contain only the music played by an individual musician. A score can be constructed from a complete set of parts and vice versa. The process can be laborious but computer software offers a more convenient and flexible method.

The emergence of Gregorian Chant notation in the tenth century, followed by refinements of it by Guido d'Arezzo during the next century, has evolved into what is now considered "standard musical notation." It has remained the standard for more than a thousand years now. While there have been a number of proposed improvements and/or new musical notations, the standard continues to remain relatively unchanged.

As many can attest, learning to read standard musical notation brings with it many challenges, thereby inhibiting many students from trying and/or succeeding in the reading of musical notation. Current instructional approaches are cumbersome, complicated, and difficult to disseminate to "beginners" in a clear, concise manner. Accordingly, the inventor has discovered that a fast and easy way to read musical notation is needed.

As described in commonly owned, U.S. Pat. No. 7,005,569, issued Feb. 28, 2006, entitled "Method for Imparting Music Score Reading and Keyboard Performance Skills," a method for reading music and playing a keyboard instrument has been developed by the inventor. It is well-known that the benefits of learning to read music and playing an instrument include, for example, increasing spatial reasoning and spatial intelligence, encouraging a sense of discipline, assisting in scientific and mathematical understanding, improving performance in school, and increasing certain aptitude test scores in students who have had experience studying an instrument. Accordingly, the inventor has continued to build on the patented method and, as described herein, has developed a one-session, interactive instructional system and method that provides the aforementioned desired fast and easy way to teach students to read musical notation and play an instrument.

SUMMARY OF THE INVENTION

The present invention resides in one aspect in a method of instructing a student to read music notation and to play a musical instrument. The method includes presenting an interactive display including a graphical representation of at least a portion of a musical instrument and a plurality of lines having spaces therebetween. The plurality of lines and spaces representing a staff of musical notation. The method also includes associating the plurality of lines and spaces with placement of at least one of a student's fingers to the musical instrument. The method further includes presenting, on the interactive display, a musical score including a plurality of notes by streaming each of the notes on one of the plurality of lines and spaces such that when each of the notes meets a portion of the graphical representation of the musical instrument. In response the student manipulates a corresponding one of their fingers to play the instrument.

In one embodiment, the method of instructing further includes educating the student to recognize that a relational distance between notes in the musical score correlate to the placement of each of the notes on the plurality of lines and spaces and placement of the student's fingers to the musical instrument.

In one embodiment, the step of presenting the plurality of lines and spaces includes presenting two sets of parallel vertical lines having a dashed parallel vertical line between the two sets. In one embodiment, all of the lines are equidistant.

In still another embodiment, the method includes presenting the musical score by streaming each of the notes on at least one of the two sets of parallel vertical lines; the plurality of spaces, and the dashed parallel vertical line. Streaming may include streaming a graphic element representing each of the notes such that the graphic element includes a symbol indicating a variation in placement of the student's fingers to the musical instrument.

In yet another embodiment, the step of presenting the musical score includes streaming a graphic element representing rhythm on the dashed parallel vertical line.

In one aspect of the invention, in a beginning level, the step of presenting the musical score includes streaming the notes as a circular graphic element such as a circular dot. In advanced levels, the step of presenting the musical score includes streaming the notes as a graphic elements depicting standard musical notation.

In yet another aspect of the invention, a game system for instructing a student to read music notation and to play a musical instrument is presented. The system includes a processing unit having memory and logic for invoking musical notation reading and instrument playing instructional methods stored in the memory. The system includes an interactive display coupled to the processing unit. The display presents a graphical representation of at least a portion of a musical instrument and a plurality of lines having spaces therebetween. The plurality of lines and spaces represent a staff of musical notation. The system also includes an input device coupled to the processing unit. The input device is operable by a player of the game system. The system further includes a template coupled to the input device. The template relates the input device to the musical instrument and associates the plurality of lines and spaces of the interactive display with placement of at least one of the player's fingers such that when the interactive display presents a musical score including a plurality of notes streamed on one of the plurality of lines and spaces, in response, the player manipulates a corresponding one of their fingers to operate the input device and to play the instrument.

BRIEF DESCRIPTION OF THE DRAWINGS

FIGS. 6A and 6B depict how lines of musical score are notated in accordance with one embodiment of the present invention;

FIG. 7 illustrates intervals in accordance with the present invention;

DETAILED DESCRIPTION OF PREFERRED EMBODIMENTS

Figure 1:
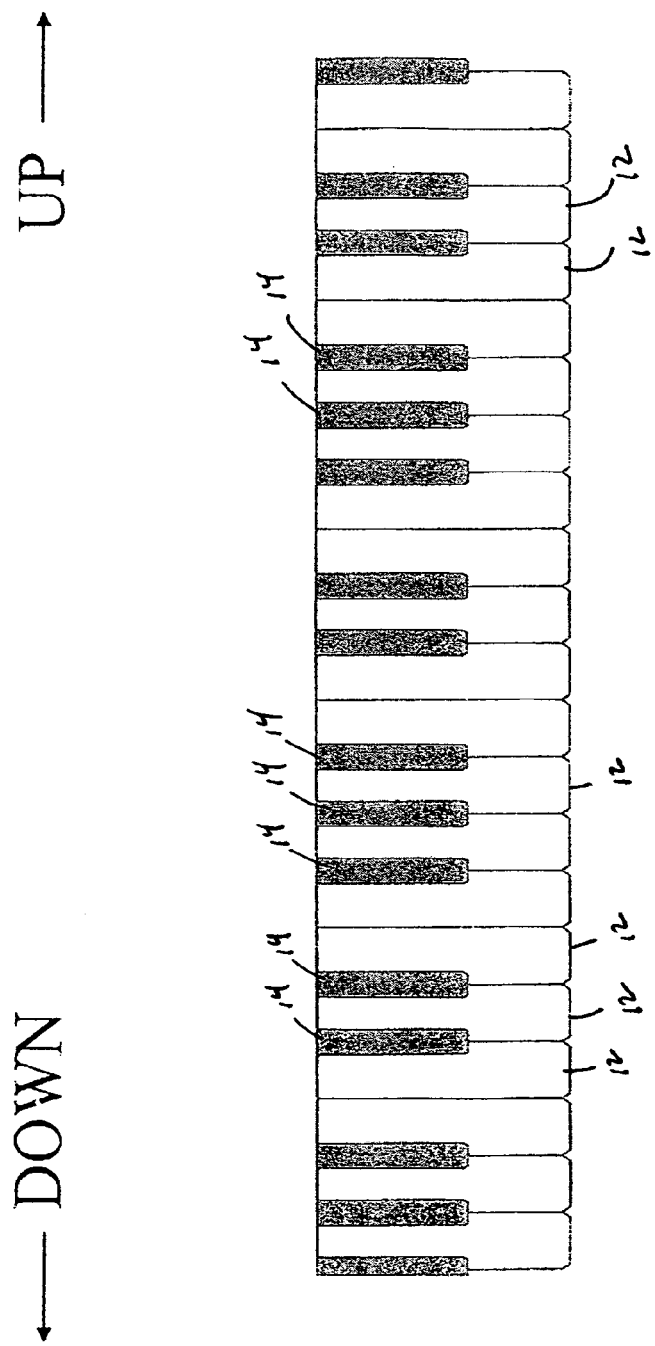
FIG. 1 is a graphic illustration of a portion of keyboard instrument, as is known in the art.

The following description, taken together with the figures described above, is provided to assist in the understanding of the teachings of the present invention. It should be appreciated that while the following discussion may highlight specific embodiments and implementations of the invention, this description is not intended to, nor should it, limit the scope of the present invention. For example, while instrument instruction may be illustrated with reference to a keyboard instrument such as a piano, it is within the scope of the present invention to instruct a student to play any musical instrument whether a keyboard instrument, a string instrument, a wind instruction, a percussion instrument, and the like, as well as any genre of music.

One philosophy behind the invention is to present musical notation in a way in which the lines and spaces on the musical score are directly correlated to the instrument being taught, for example, the white keys on the keyboard. In essence the lines and spaces on the score are "mated" to/associated with corresponding white keys on the keyboard. In short, the present invention pares musical notation down to the rawest, simplest and most efficient form possible. Due to the elegant simplicity of the present invention, the student is able to play an instrument and read music within minutes of instruction. The foundation of the invention has its roots in standard musical notation. This is a significant benefit over existing instructional systems and methods because not only does the student begin reading music and playing an instrument within minutes, but the student also understands the concepts behind standard musical notation, in its full scope, from the beginning.

Imagine if you will, the current challenges in learning to read standard musical notation for a keyboard instrument. Traditional methods require the student to first be able to name the note positioned on the score (e.g., a memorization-driven task). The student then needs to look down at the keyboard and attempt to find a key that looks like the name of the note they just deciphered (also a memorization-driven task). There are seven (7), and sometimes eight (8), keys that match the name of the note just identified. Yet only one of these keys is the right match to the musical score. The student must then go through the entire process again to find the next note in the score. This discrete manner of finding notes is cumbersome and tedious for most students to learn.

To the contrary, the present invention is based on intervals. Intervals are the distance from one note to a next note. Another way to describe an interval is the distance between and including two notes on the musical score. An interval is determined on the musical score simply by beginning to count the initial note residing on a line or a space, continuing to count subsequent spaces or lines as we approach and include the space or line of a next note. The total number counted between and including the initial and the next note is the interval itself. For example, on the keyboard implementation, we play an initial white key and move to the right or to the left (depending on the position of the two notes), skipping over white keys (if any) as we count the total number previously determined and land on our "next" note. This process facilitates "seeing" the distance on the music score (spatial reasoning), "feeling" the distance on the keyboard (tactile experience) and subsequently "hearing" the distance (or relational pitches of the notes) which automatically trains and develops the musical ear in a natural way. There is direct correlation between what the student/player sees on the score, what the student/player feels on the keyboard and what they hear. With the present invention, reading music is introduced without the need for initial knowledge of complex musical notation or gimmicks. For example, the present invention imparts a full scope of musical knowledge, in one session, without the use the initial understanding of clefs, key signatures, time signatures, without the need for naming notes, and without conventional "color coding" of music score and keys to facilitate learning (e.g., a "monkey-see," "monkey-do" approach to learning). As can be appreciated, conventional learning systems have significant disadvantages, for example, a color blind player would be unable to use a system based merely on color coding.

The inventor has discovered that because the invention is based on logic and not memorization, results are immediate and retention is enduring. With the invention, any student/player is able to play a keyboard right away, read music right away, go to any keyboard and play, go to any keyboard and read music, play and learn the keyboard on their own, and play and learn the keyboard with others. By student/player, it is envisioned that the audience for the systems and methods of the present invention includes, for example, young adults age 12 and up as well as adults who have never learned to read music, have forgotten how to read music, who are convinced they won't be able to read music or have been told they have no ability, and who want to play an instrument such as the piano after one session.

The systems and methods for interactive instruction as described herein and, in particular, the systems and methods for instructing students in music score reading and instrument playing, are borne from the inventor's unrelenting desire to provide the key to uncovering the seemingly "mysterious" notion of reading music and playing a keyboard instrument in an easy, effective, fun and remarkably fast way. As described herein, the interactive instruction can be presented in one session, with the student playing a keyboard instrument and reading music with both hands upon completion.

One embodiment of an interactive instructional method is described below. This method is based on teaching music reading as it applies to the keys on a keyboard instrument and brings about an understanding of rhythm from whole notes through to eighth notes.

Logistics: Begin with the student seated at a table, and presented the student with FIG. 1.

Objective: To become familiar with the visual makeup of a keyboard by demonstrating to the student the meaning of up and down (direction) as it relates to the keyboard, to hear what "high" versus "low" pitches sound like on the keyboard, and to discuss how, visually, the sets of two-black keys and three-black keys minimize the "chaos" that the white keys displayed alone present.

Teacher instructs Student: As shown in FIG. 1, a keyboard 10 is typically positioned horizontally. On the keyboard, "up" (going to higher pitches) is achieved by moving to the right, while "down" (going to lower pitches) is achieved by moving to the left. If we play keys way up high (toward the rightmost area), the pitches sounds high—similar to the pitches birds make. If we play keys way down low (toward the leftmost area), the pitches sound low—similar to the pitches foghorns make. By looking at the image of the keyboard 10 on FIG. 1, we see a continuum of white keys 12 along with sets of two and three black keys 14. The sets of two and three black keys 14 help minimize the chaos and enable a student/player to form patterns. This makes it easier to navigate around the keyboard 10.

Logistics: Have the student seated at the keyboard.
Objective: To reinforce the concept of direction.
Teacher instructs Student:

A. Move up the keyboard (to the right) by playing each set of two-black keys, striking them together. Hint: Begin with the lowest set.

B. Move down the keyboard (to the left) by playing each set of three-blacks keys, striking them together. Hint: Begin with the highest set.

Objective: To understand distance between and including two notes (called intervals)

Teacher instructs Student:

C. Play two white keys at the same time that are side by side in the high area of the keyboard. Play two white keys at the same time that are side by side in the low area of the keyboard. Play two white keys at the same time that are side by side in the middle area of the keyboard.

D. Beginning on the lowest (leftmost) white key, play the first key and move up (just to the right) to a second white key, playing them separately. Say "up a second" aloud as you play the second note. Having played this second key, play it again but pretend it is now a first key and move up to a "new" second white key. With each of these two-key motions, say "up a second" aloud as you play the second note.

Continue in this fashion all the way up to the highest (rightmost) key. The distance comprising this two-key motion is called a "second" because you are moving from a first key to a neighboring, next key. The distance between-and-including any two keys is called an "interval." You have been playing the interval of a "second" on the keyboard and, visually, seconds look like neighboring keys.

E. Beginning at the highest (rightmost) white key, play the first key, skip over the second white key, to the third white key, playing one and then the other. Say "down a third" aloud as you play the third white key. Having played the third key, play it again but pretend it is now a first key and move down to a "new" third key. With each of these movements, say "down a third" aloud. Continue in this fashion all the way down to the lowest (leftmost) key. The interval you have been playing is called a "third" because you are moving from a first key, skipping over a second key and landing on a third key. Thirds look like skips on the keyboard.

F. Beginning on the lowest white key, play the first key, skip over the second white key, skip over the third white key, to the fourth white key. With each of these movements, say "up a fourth" aloud. Having played this fourth key, play it again but pretend it is now a first key and skip up to a new fourth key. Continue in this fashion all the way up to the highest key while saying "up a fourth" aloud each time. This interval is called a "fourth" because you are moving from the first white key, skipping a second white key, skipping a third white key and landing on a fourth key.

G. Beginning on the highest white key, play the first key, skip over the second key, skip over the third key, skip over the fourth key to the fifth key. With each of these movements, say "down a fifth" aloud. Having played this fifth key, play it again but pretend it is now a first key and skip up to a new fifth key. Continue in this fashion all the way down to the lowest key while saying "down a fifth" aloud each time. This interval is called a "fifth" because you are moving from the first white key, skipping a second white key, skipping a third white key, skipping a fourth key, and landing on a fifth key. Notice how the interval of a fifth fits naturally in your hand. This is because each white note corresponds to (is "taken" by) each of your five fingers.

H. Beginning on the lowest white key, play the first key, skip over the second key, skip over the third key, skip over the fourth key, skip over the fifth key to the sixth key. With each of these movements, say "up a sixth" aloud. Having played this sixth key, play it again and pretend it is now a first key and skip up to a new sixth key. Continue in this fashion all the way up to the highest key while saying "up a sixth" aloud each time.

I. Beginning on the highest white key, play the first key, skip over the second key, skip over the third key, skip over the fourth key, skip over the fifth key, skip over the sixth key to the seventh key. With each of these movements, say "down a seventh" aloud. Having played this seventh key, play it again and pretend it is now a first key and skip down to a new seventh key. Continue in this fashion all the way down to the lowest key while saying "down a seventh" aloud each time.

J. Beginning on the lowest white key, play the first key, skip over the second key, skip over the third key, skip over the fourth key, skip over the fifth key, skip over the sixth key, skip over the seventh key, to the eighth key. With each of these movements, say "up an eighth" aloud. Having played this eighth key, play it again and pretend it is now a "first key" and skip up to a "new" eighth key. Continue in this fashion all the way up to the highest key while saying "up an eighth" aloud each time. The interval of an eighth is also known as an octave. With an interval of an octave, the notes will look identical, but in different areas of the keyboard. The notes will sound similar, although they will sound higher or lower depending on where the octave is being played on the keyboard.

Figure 2:
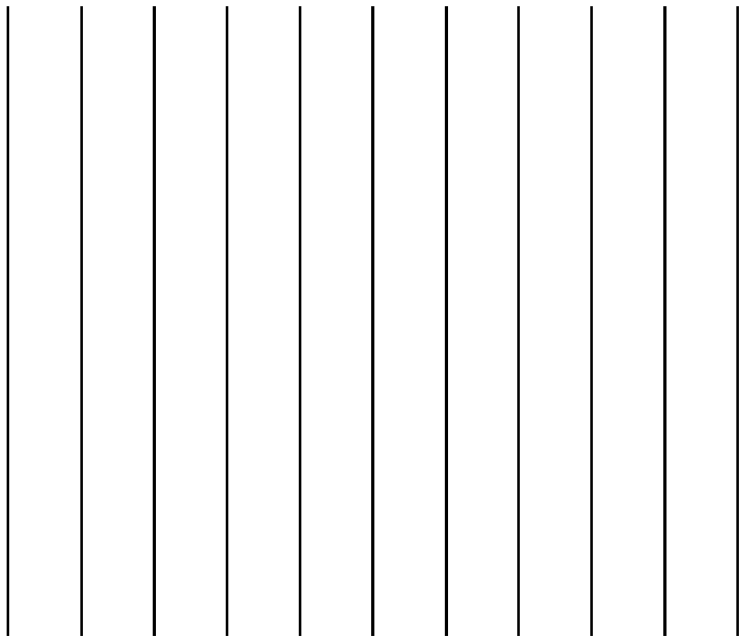
FIG. 2 is a simplified graphic representation of lines of a musical staff.

Logistics: Return to the table and present the student with FIG. 2.

Objective: To introduce the student to music score reading.

Teacher instructs Student: On FIG. 2, we see eleven (11) horizontal lines, shown generally at 16, with a space (or "air") between each of them. We experience a similar sense of chaos here as it is difficult to quickly identify the centermost line.

Figure 3:
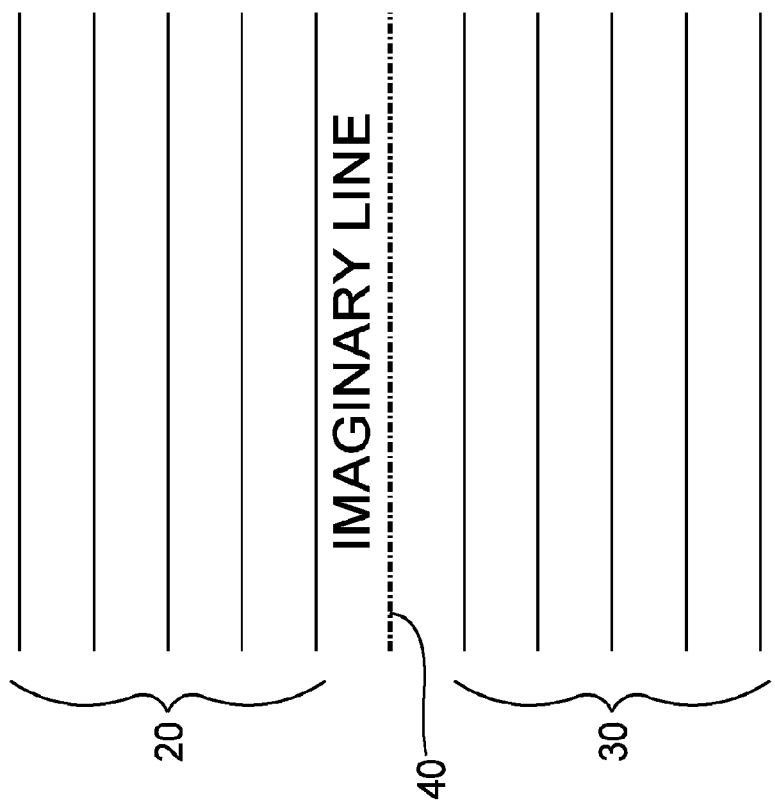
FIG. 3 is a modified representation of the staff of FIG. 2, in accordance with one embodiment of the present invention.

Teacher presents the Student with FIG. 3 and instructs Student. As we look at FIG. 3, we see a set of dashes 40 replacing the middle line. This essentially separates the figure into two sets 20 and 30 of five (5) horizontal lines, with the dashed line 40 in between. The dashed line 40 helps to minimize the chaos formed with just the eleven (11) lines themselves. Each set of five (5) lines is called a "staff" and the two sets 20 and 30 of five (5) lines together are known as "the Grand Staff." Let us call the dashed line 40 the "Imaginary Line."

Logistics: Turn to FIG. 4.

Objective: To grasp the idea of following music on the score.

Figure 4:
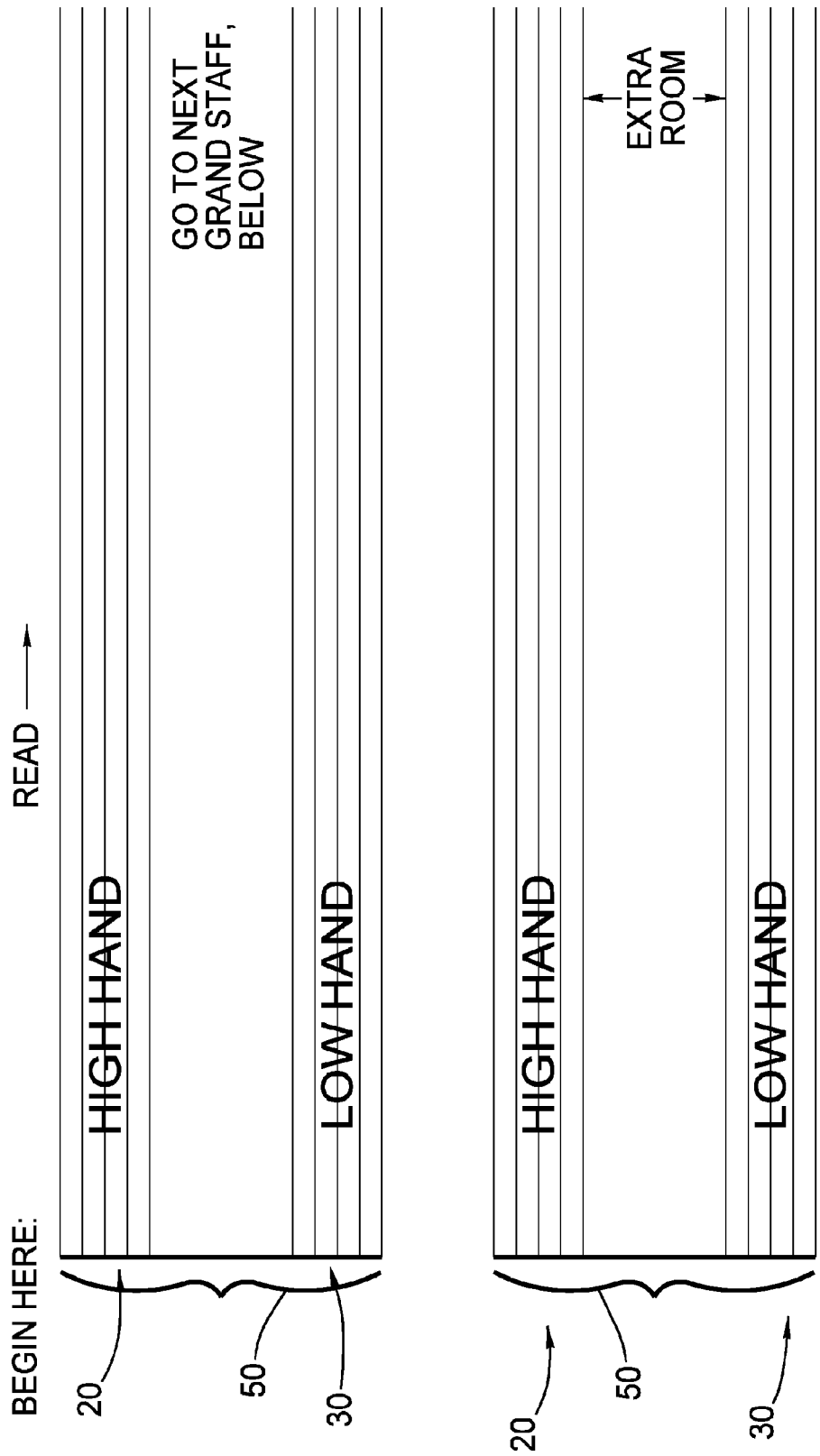
FIG. 4 is a graphical representation of musical staffs used in score-writing, as are known in the art.

Teacher instructs Student: On FIG. 4, the Imaginary Line 40 is removed and there is additional space between our two staffs 20 and 30. There is considerable space between the staffs, but remember that only one line, the Imaginary Line 40, is missing. The extra room between the lines simply makes score-writing easier. We will address this issue at a later time. A new symbol 50 called a "brace" can be found at the leftmost position. The brace 50 looks like this "{|" and it means that our two staffs with space between, our Grand Staff, are read horizontally together. In reading keyboard music, one begins at the top left corner and reads the musical score on the Grand Staff until the rightmost point of FIG. 4 is reached. Then, one goes to the Grand Staff below and continues in this fashion until the piece ends. For the most part, the upper staff 20 applies to the right hand and the lower staff 30 applies to the left hand for keyboard reading.

Logistics: Turn to FIG. 5.

Objective: To grasp the idea of how direction (up versus down) is depicted on the score and how direction on the score affects what we hear.

Figure 5:
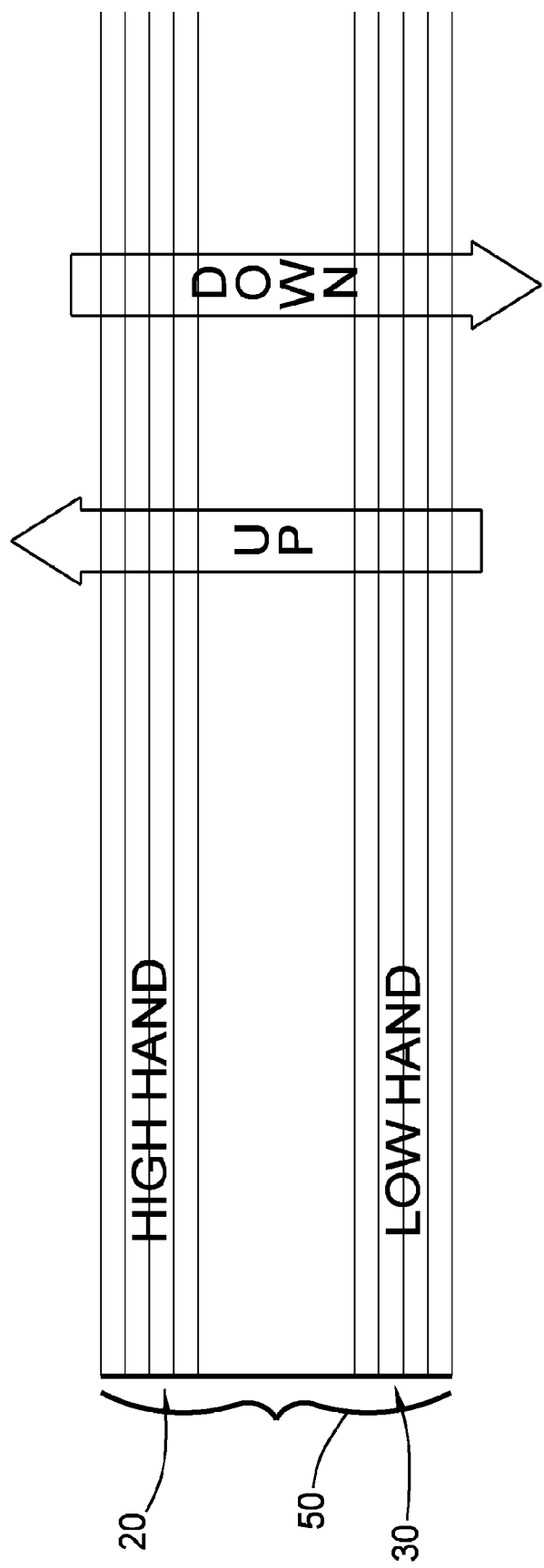
FIG. 5 depicts how direction is read in conventional musical score.
Figure 8:
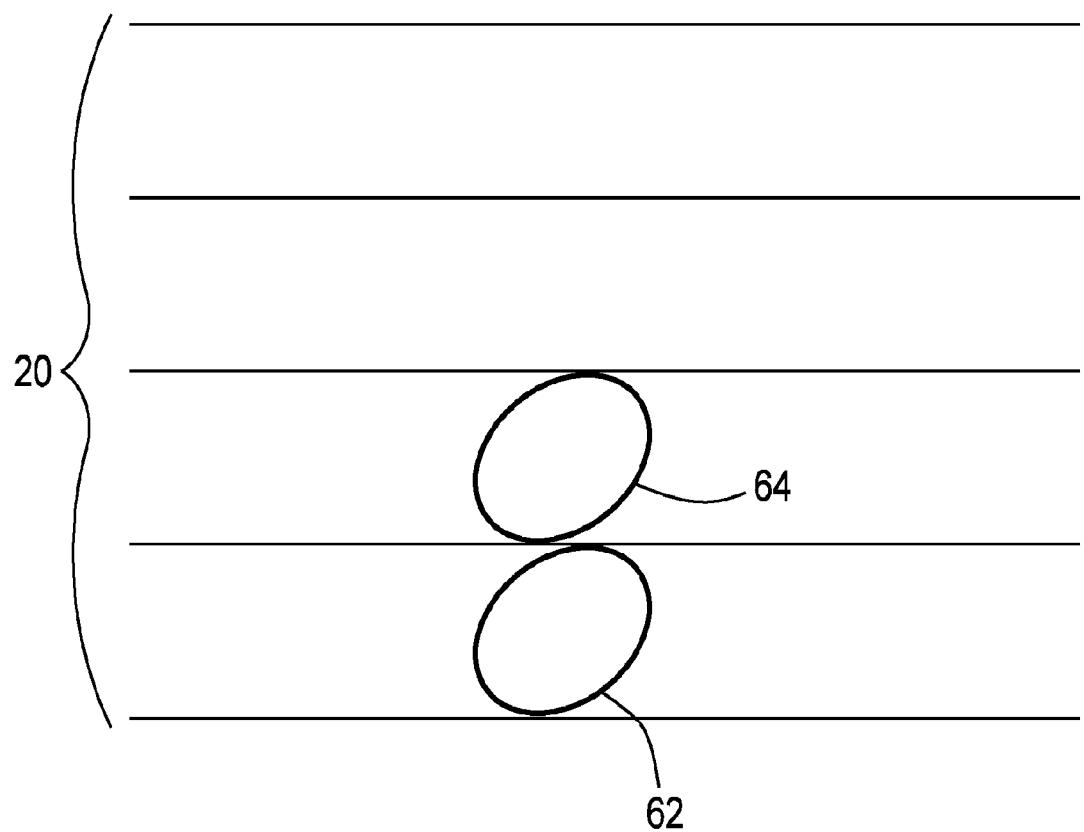
FIGS. 8-18 illustrate various intervals presented on a portion of musical staffs in accordance with the present invention.
Figure 9:
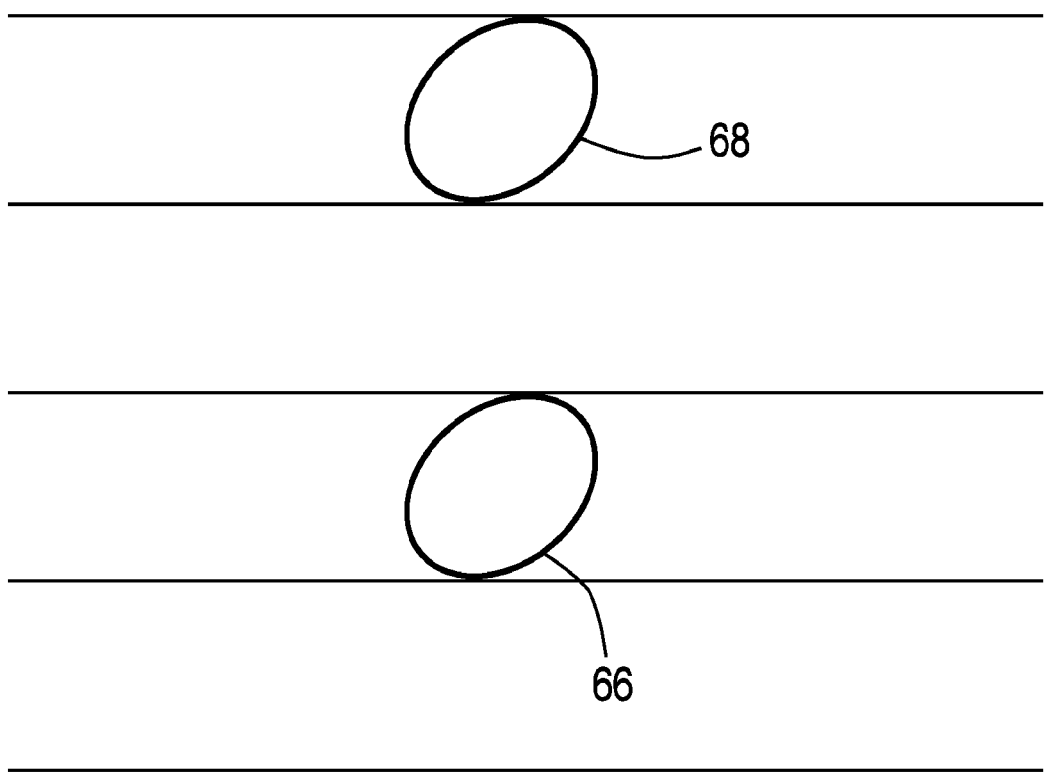

Teacher instructs Student: FIG. 5 shows us that the higher we climb up the grand staff, the higher the pitch will sound. The lower we climb down the grand staff, the lower the pitch will sound. An easy analogy is as follows. Imagine climbing up a ladder to reach higher tones and climbing down a ladder to reach lower tones.

Logistics: Turn to FIGS. 6A and 6B.

Objectives: Understanding what "on the line" and "on the space" mean as they relate to reading music, and understanding that reading an interval on the score means counting the number of lines and spaces encompassing both notes being represented in addition to the lines and/or spaces in between.

Teacher instructs Student: On our first staff, illustrated in FIG. 6A, we see the words "line" and "space" written on the staff as we climb up the staff to higher pitches. Notice that an actual line goes straight through the word "line." These positions are called "on the line." Notice that the word "space" lies in the "air" between the lines. These positions are called "on the space." In FIG. 6B, we see notes in their "true" form, moving up from a line, to a space, to a line, to a space, etc. Because the notes are climbing from a line to a space to a line to a space, etc., the notes must be neighbors, or "intervals of a second." Furthermore, the pitches must be going up as we are climbing up the ladder. Importantly, here is the SECRET, each note "on the line" and each note "on the space" represents a WHITE KEY on the keyboard!!

Logistics: Turn to FIG. 7.

Objective: Learning to identify thirds at sight.

Teacher instructs Student: Look at FIG. 7. If we move from a note on any of the five horizontal lines to a note on any adjacent horizontal line (moving either up or down), we are moving from a "note on the line" (our first note), skipping the "note on the space" (our second note) and arriving on the next "note on the line" (our third note). Therefore, an interval that moves from a line to an adjacent line MUST be a third. Similarly, as we move from any "note on a space" (our first note), skipping over the "note on the line" (our second note), we arrive at the next "note on the space" (our third note.). This is also a third! Therefore, an interval that moves from a space to the next space MUST also be a third.

Logistics: Begin using interval flash cards, FIGS. 8-18.

Objective: Identifying intervals on the staff visually by way of flash cards.

Teacher instructs Student: We have learned that intervals represent the distance between and including two notes. Look at FIG. 8. We see two notes 62 and 64 and each note resides on a space. Touch our first note 62, which is on the space and say "one." Now touch the line in between the notes and say, "two," and then touch the next note 64 and say, "three." This is an interval of a third. Look at FIG. 9. We see two notes 66 and 68 and each note resides on the space. To determine the interval, we touch our first note 66 on the space and say "one," touch the line in the direction of the other note and say "two," continue in the same direction, touch the space and say, "three," continue in the same direction, touch the space and say, "four," and touch the other note 68 on the space and say, "five." This interval is a fifth.

Figure 10:
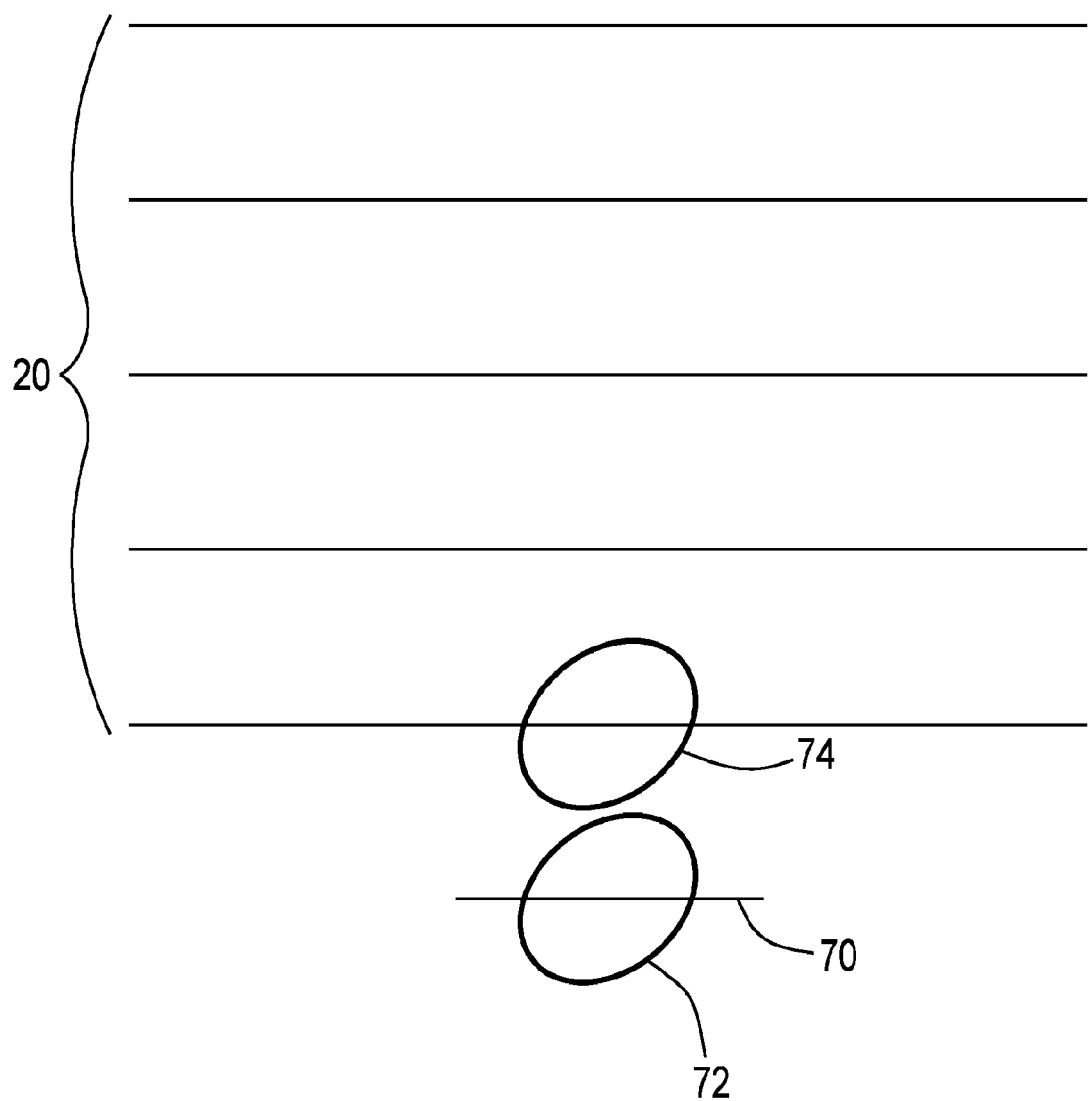
Figure 11:
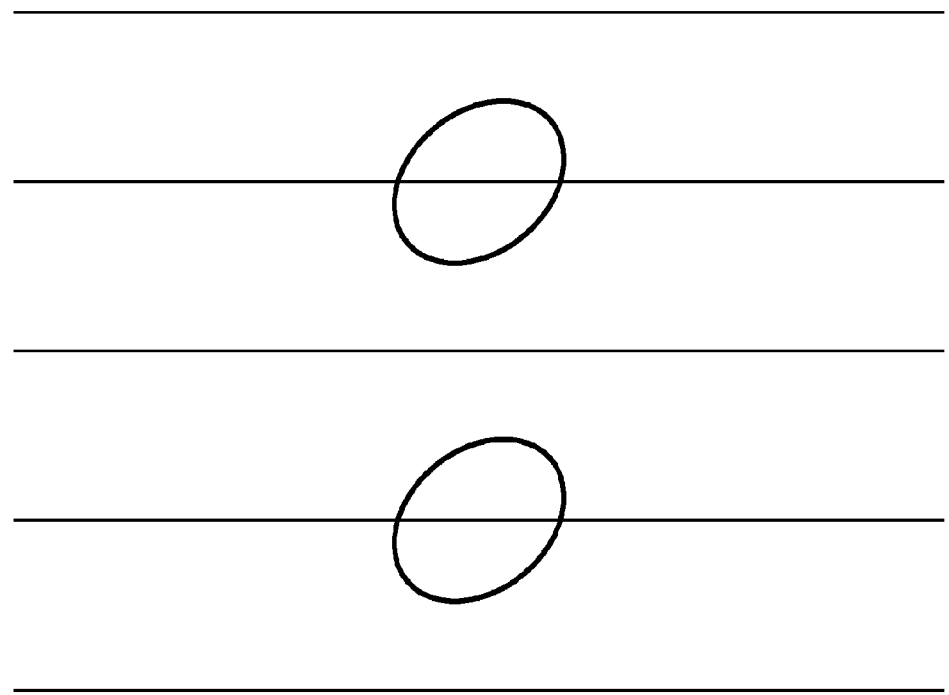
Figure 12:
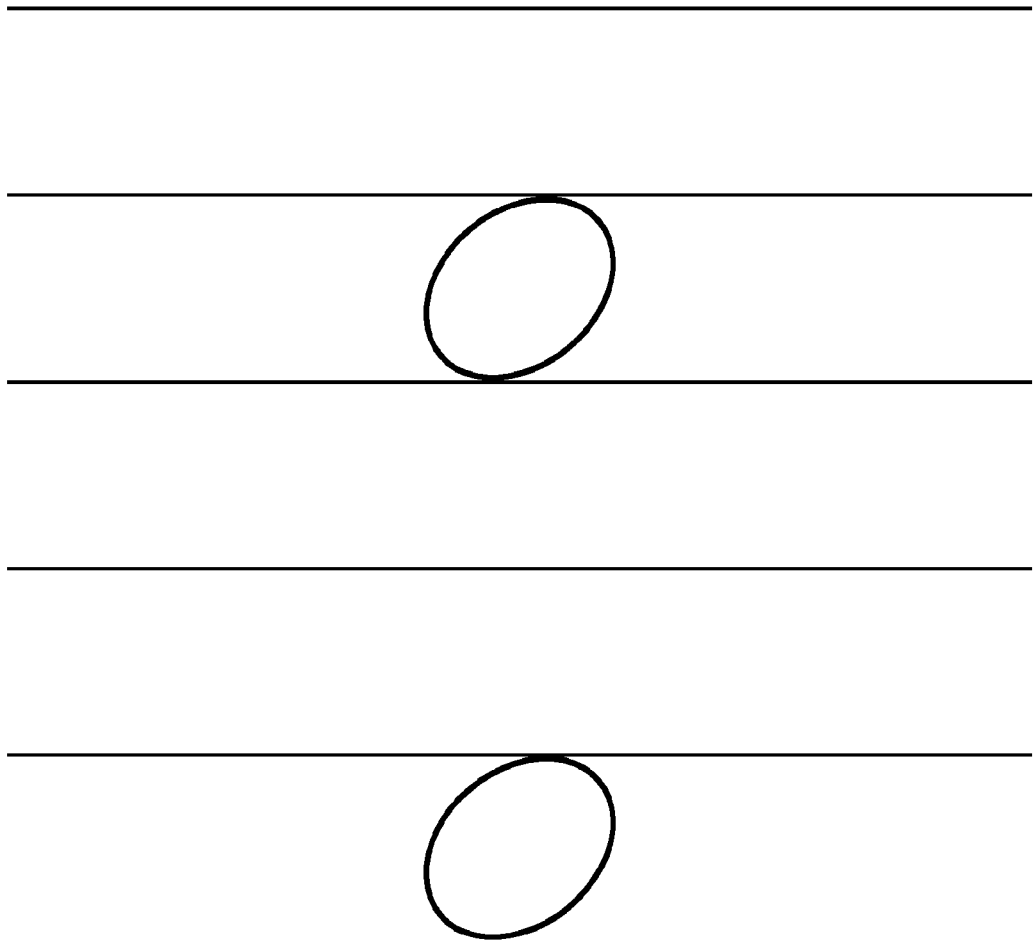
Figure 13:
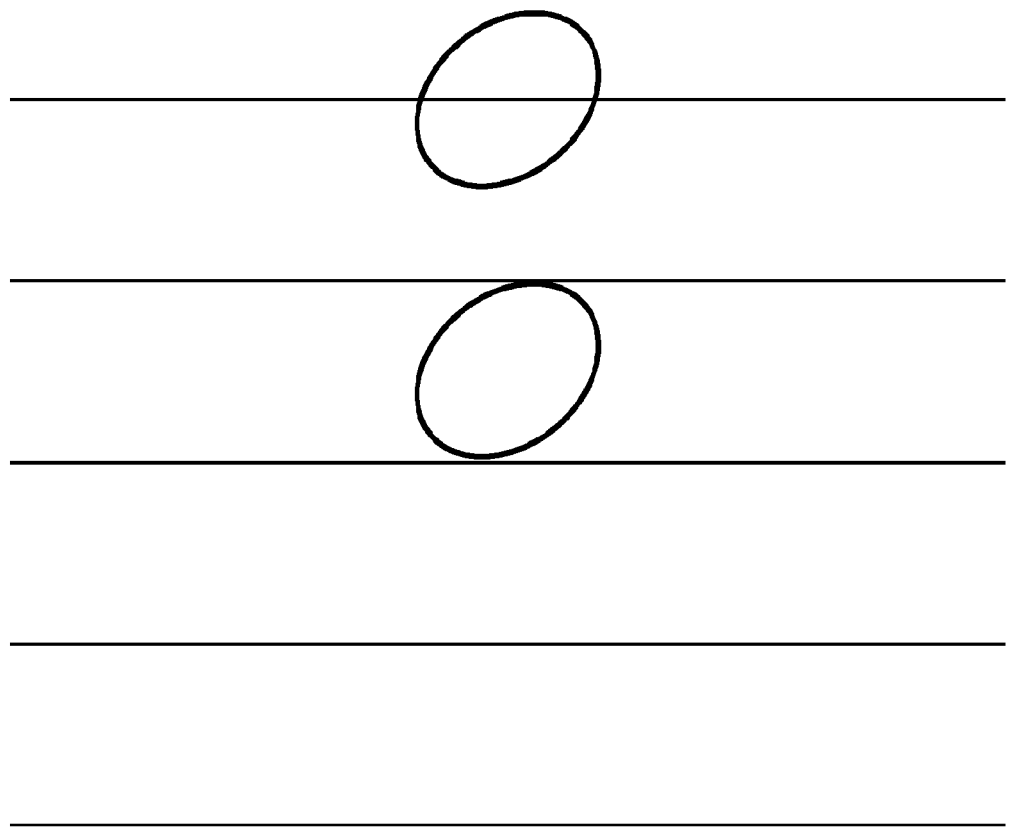

Look at FIG. 10. Because we wanted to represent a note that goes beyond the notes represented on our five (5) line staff 20, another line 70, though shorter, is displayed. The process is still the same. Line, space between, line. This interval is a third. Look at FIG. 11. Line, space between, line between, space between, line. This is a fifth. Look at FIG. 12.

Figure 14:
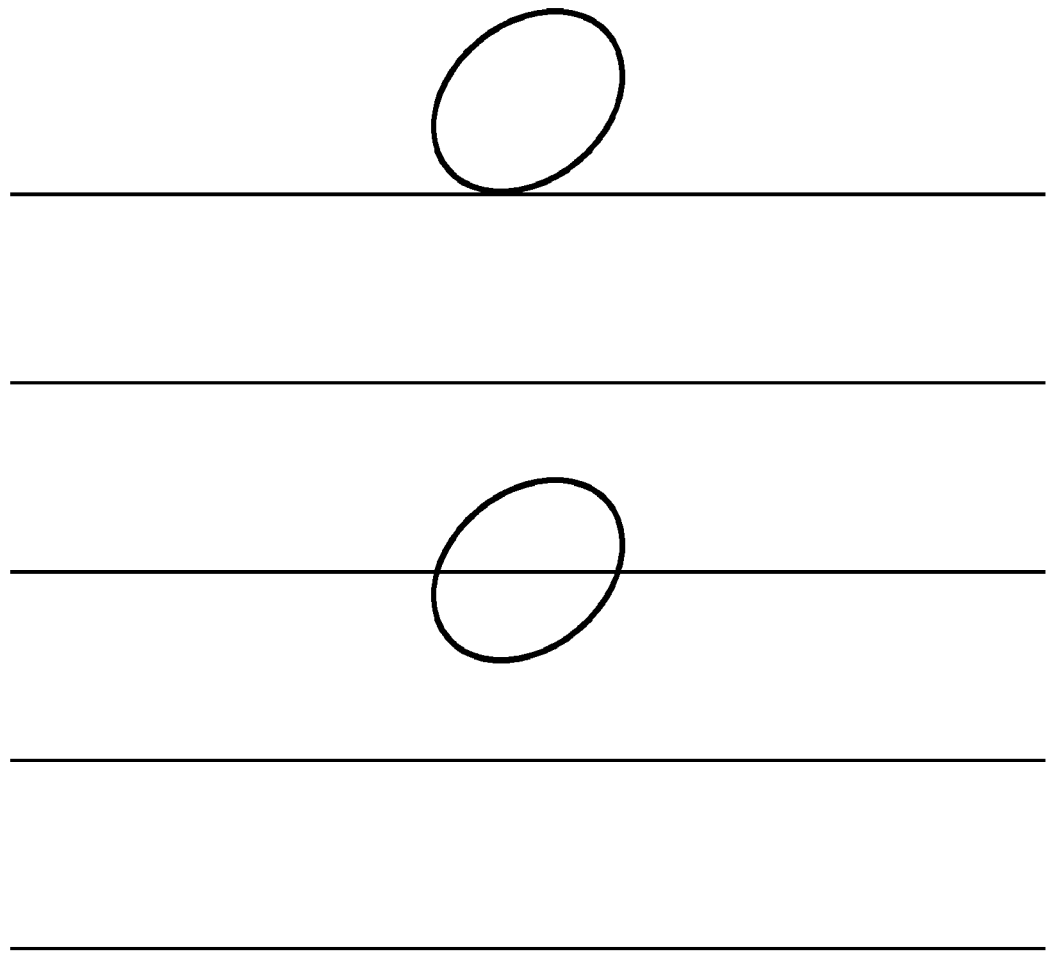
Figure 15:
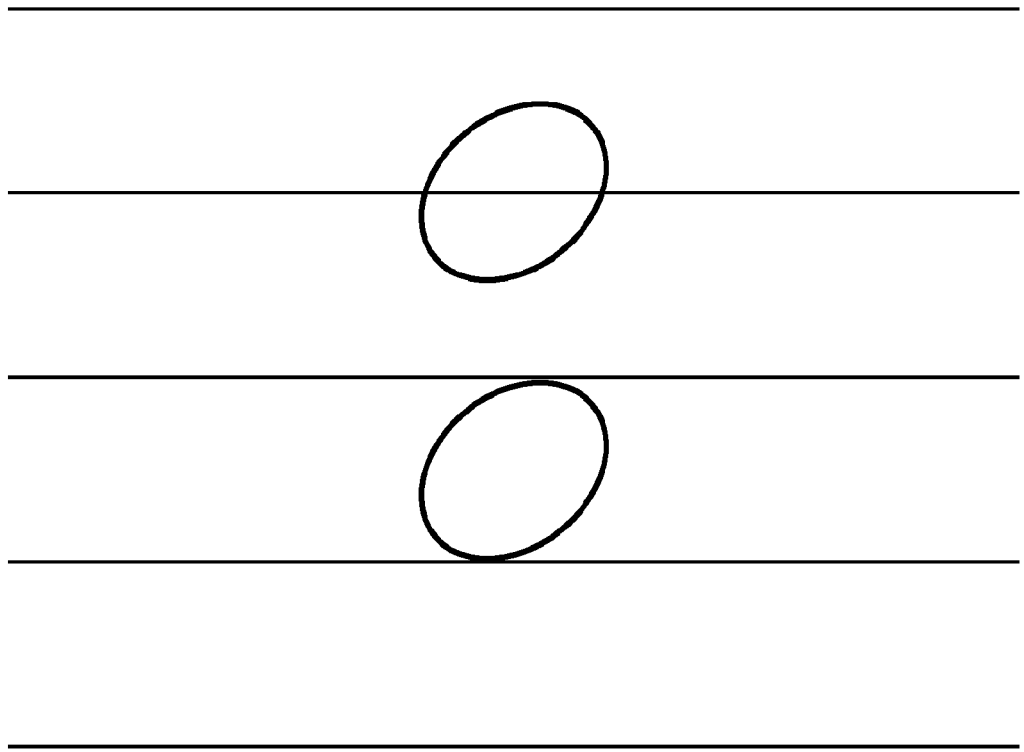
Figure 16:
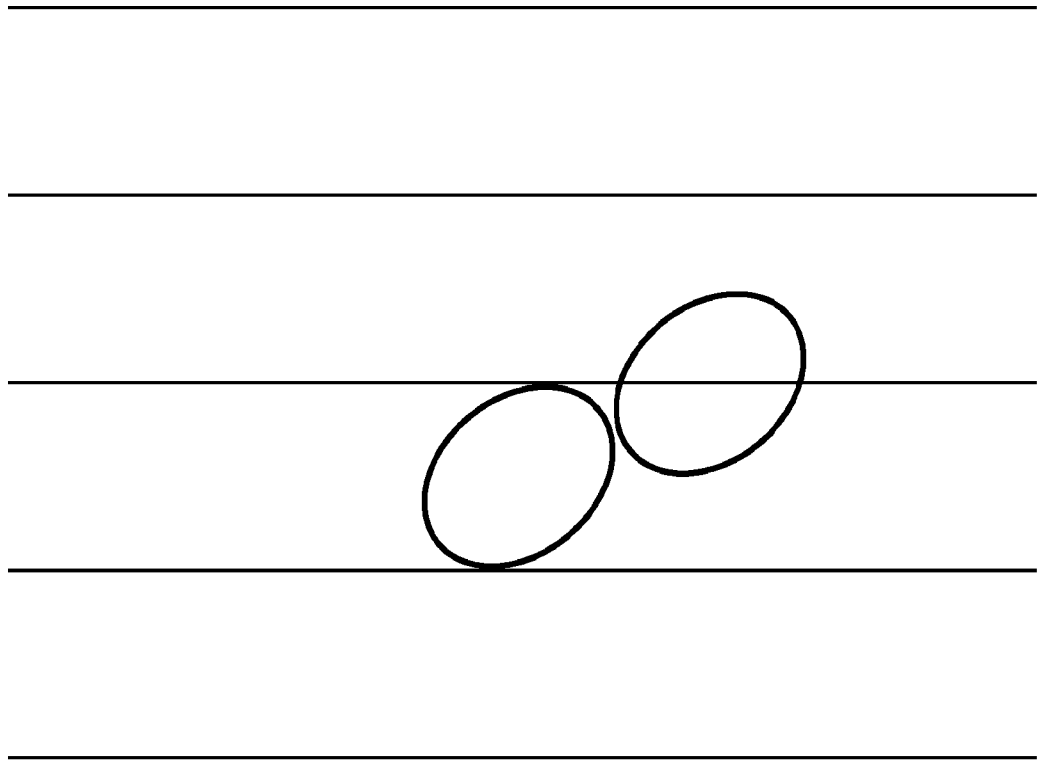
Figure 17:
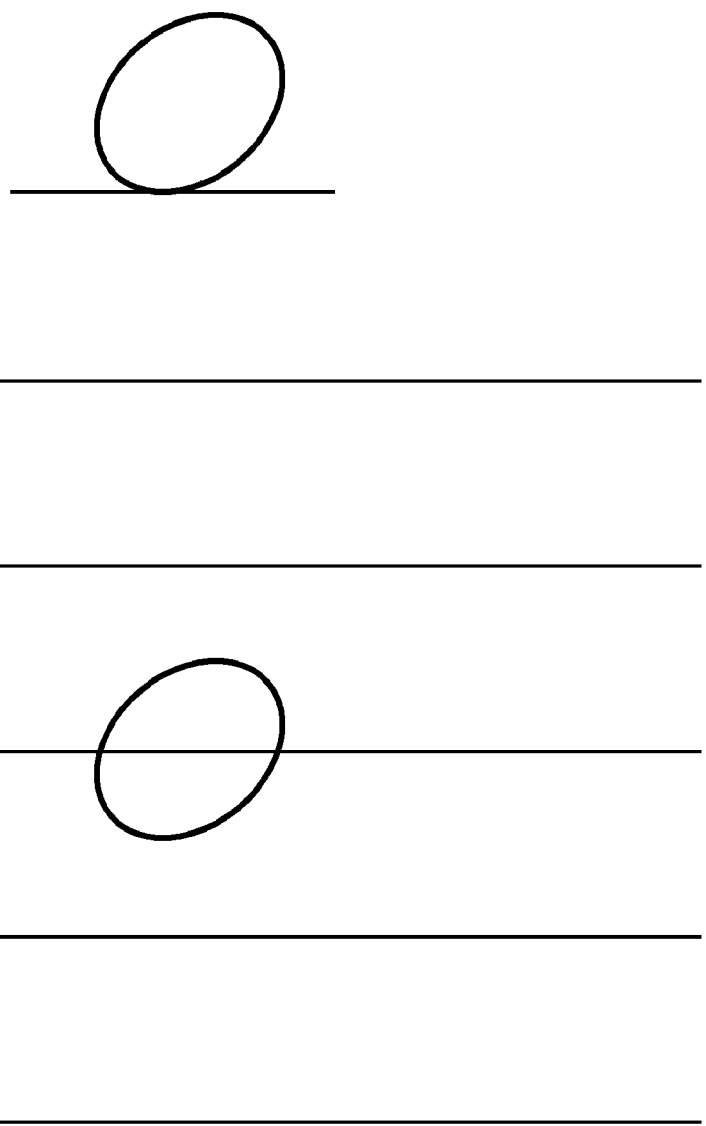
Figure 18:
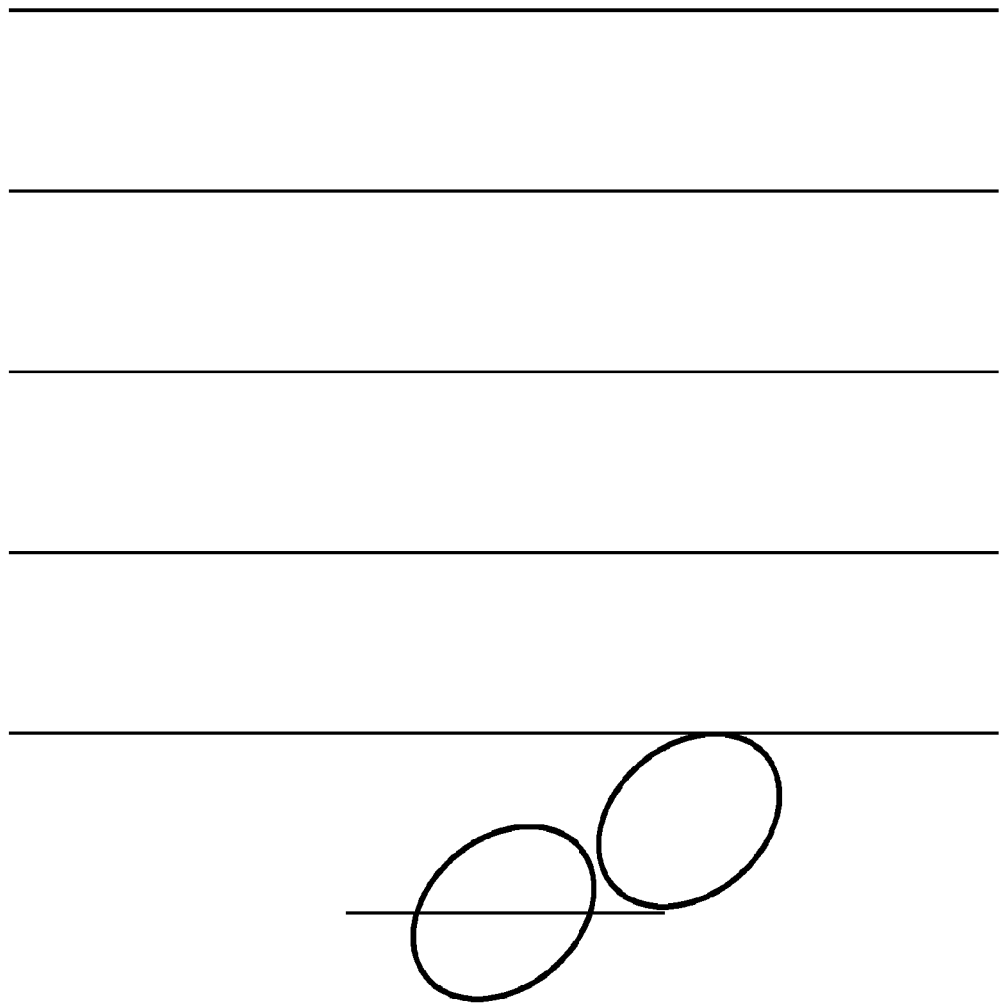

Space, line, space, line, space, line, space. This a seventh. Intervals encompassing a line to another line, or a space to another space are "odd in number." An easy way to determine the distance of an odd-numbered interval is to move from line to adjacent line or space to adjacent space, counting by odd numbers. Similarly, intervals encompassing a line to a space, or a space to a line are "even in number." Look at FIG. 13. This interval starts on a space, goes up a line, up to another space, ending on a line. This interval is a fourth. FIG. 14 is a sixth; having a line, up to a space, line, space, line, space. FIG. 15 is a fourth. FIG. 16 is a second. The reason the notes are not vertically aligned is because the perimeters of the notes themselves would overlap, which would make it too difficult to decipher visibly what the interval is. FIG. 17 is an eighth, also known as an octave. FIG. 18 is a second.

Figure 19:
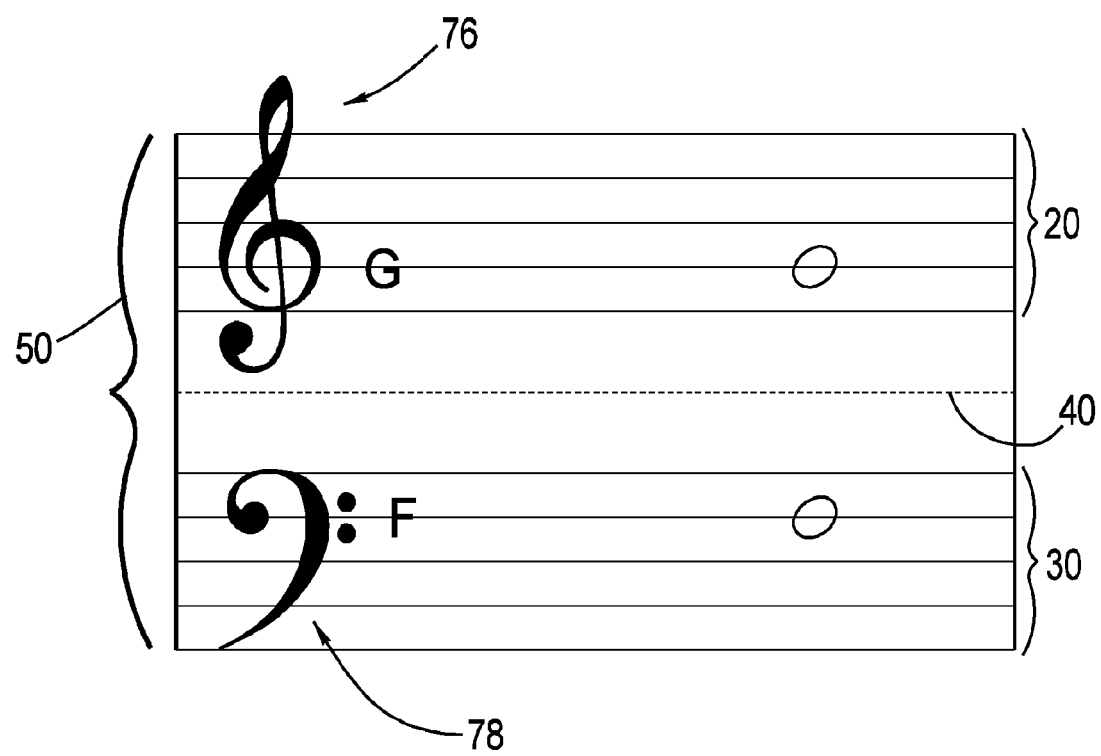
FIG. 19 depicts clefs presented on the modified representation of the staff of FIG. 3.

Logistics: Turn to FIG. 19.

Objective: Introducing Clefs as indicators of Starting Points.

Teacher instructs Student: A clef is a symbol that represents a certain pitch for a written note residing on a line on the music score. You will find clefs on the score just after the brace we spoke about earlier. Music written for the keyboard utilizes two clefs. The upper is the "Treble (meaning high) Clef" shown in FIG. 19 at 76. The Treble Clef 76 (most often used with the right hand) corresponds to a note known as "Treble G" on the keyboard. The lower clef is the "Bass (meaning low) Clef" shown in FIG. 19 at 78. The Bass Clef 78 (most often used with the left hand) corresponds to a note known as "Bass F" on the keyboard. It is helpful to think of the names of these clefs as Treble G Clef and Bass F Clef to reinforce what starting points these clefs represent. Look at FIG. 19 to see how Treble G Clef 76 and Bass F Clef 78 appear on the score. For the moment, we are looking at a score that has room for the Imaginary Line 40, but does not have extra room beyond that. This is just to simplify the purpose of our upcoming concept. With a bit of creative imagination; one can see how Treble G Clef 76 can take on the appearance of standard capital letter G, and how Bass F Clef 78 can take on the appearance of the standard capital letter F.

Figure 20:
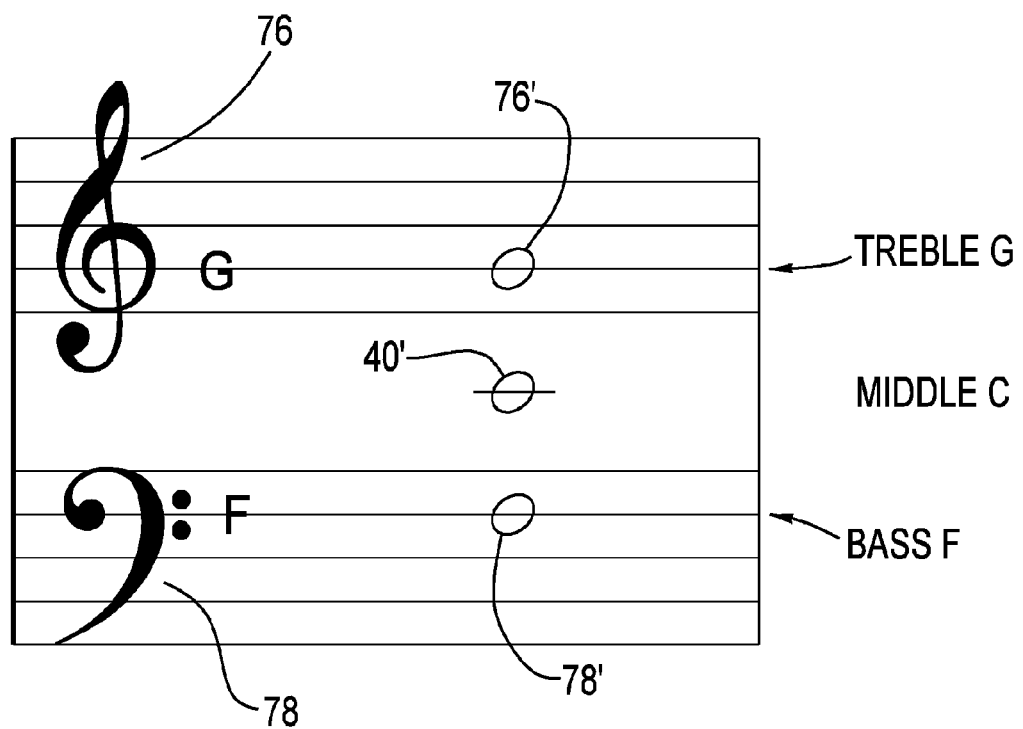
FIG. 20 illustrates starting points of the modified staff of FIG. 19.

Logistics: Turn to FIG. 20.

Objective: Discuss positioning of our 3 Starting Points: Treble G 76, Bass F 78, and Middle C (a.k.a. the Imaginary Line 40) on the score.

Teacher instructs Student: On FIG. 20, we can see where the actual Starting Point Notes 76', 78' and 40' (Treble G, Middle C (a.k.a. the Imaginary Line 40), and Bass F) are positioned on the score. You might notice that the notes Treble G 76' and Bass F 78' are equidistant (like a mirror image) from Middle C 40'. In fact the notes Treble G 76' and bass F 78' are each the interval of a fifth above and below (respectively) Middle C 40'.

Figure 21:
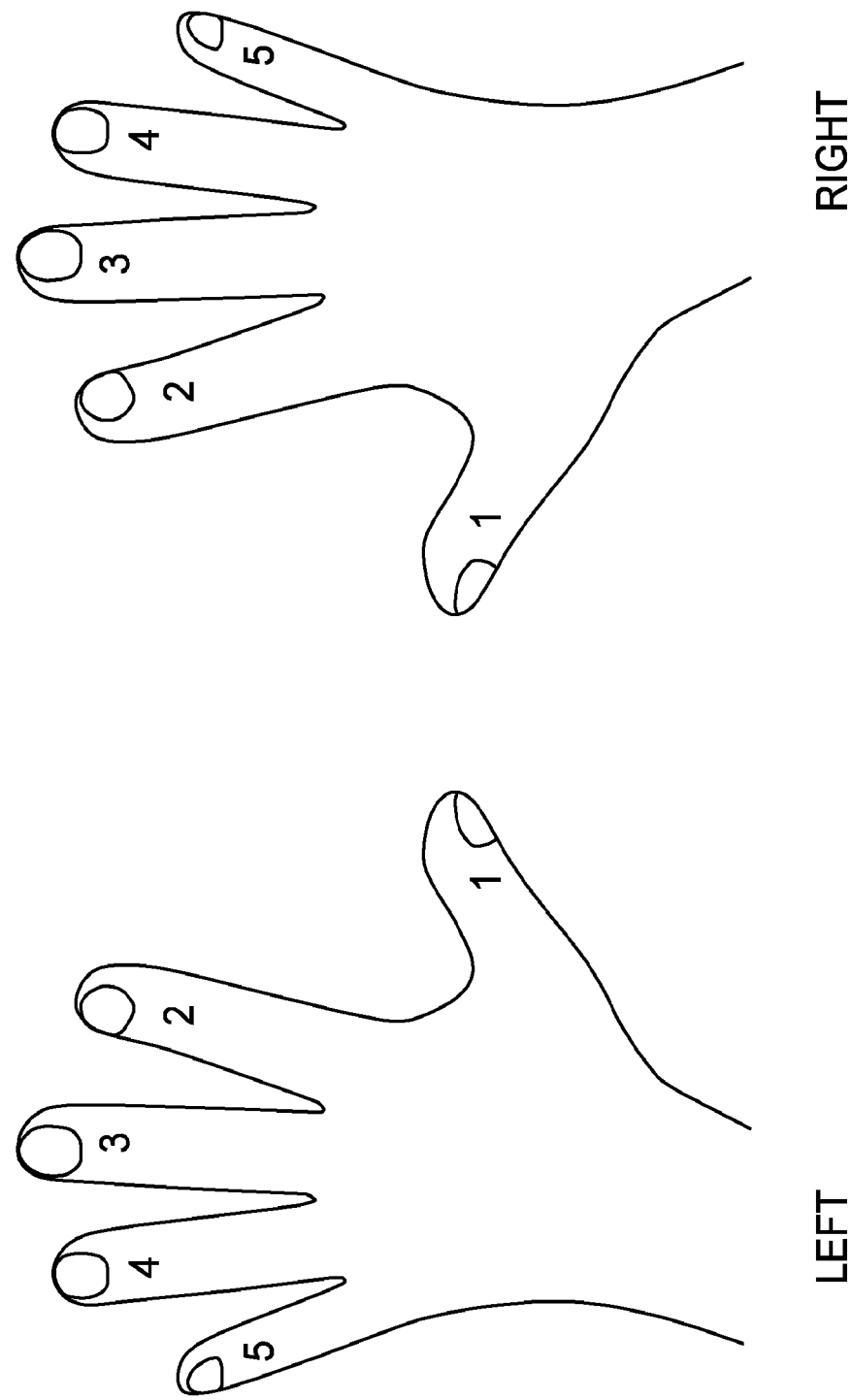
FIG. 21 illustrates relationships between fingers of a student's hands and intervals between musical notes.

Logistics: Turn to FIG. 21.

Objective: To learn finger numbers and begin to associate finger numbers with intervals.

Teacher instructs Student:

A. Please raise your right hand. Wiggle your thumb. This corresponds to the finger number one and we will call it "one." Now wiggle your index finger. This corresponds to the finger number two and we will call it "two." Wiggle your middle finger. This corresponds to the finger number three and we will call it "three." Now wiggle your ring finger. This corresponds to the finger number four and we will call it "four." Lastly, please wiggle your pinky. This corresponds to the finger number five and we will call it "five." Repeat the same process with the left hand.

B. Please raise your right hand. Wiggle your one, and then wiggle your two. Wiggle your one, and then wiggle your three. Wiggle your one, and then wiggle your four. Wiggle your one, and then wiggle your five. Repeat the same process with the left hand.

C. Raise both hands. Wiggle your ones. Wiggle your threes. Wiggle your fives. Wiggle your twos. You may notice that the fingers you are wiggling are moving in a mirror image fashion, also known as "contrary motion."

D. Please raise your right hand. As you perform the following instructions, try to envision in your mind how the movements will look on the keyboard. Wiggle your three. Go up a second. Go up another second. Go down a fourth. Go down a second. Go up a third. Go up another third. Go down a fifth. Repeat the same process with the left hand.

E. We will now try the instructions in section D using both hands at the same time. Your fingers will be moving in parallel motion and this can be challenging. We begin by raising both hands and wiggling our threes. Go up a second. Your right hand will wiggle finger number four and your left hand will wiggle finger number two. Go up another second. Your right hand will wiggle finger number five and your left hand will wiggle finger number one. Go down a fourth. Your right hand wiggles two and left hand wiggles four. Go down a second. Your right hand wiggles one and left hand wiggles five. Go up a third. Your right hand wiggles three and left hand wiggles three. Go up another third. Your right hand wiggles five and left hand wiggles one. Go down a fifth. Your right hand wiggles one and left hand wiggles five.

Figure 22:
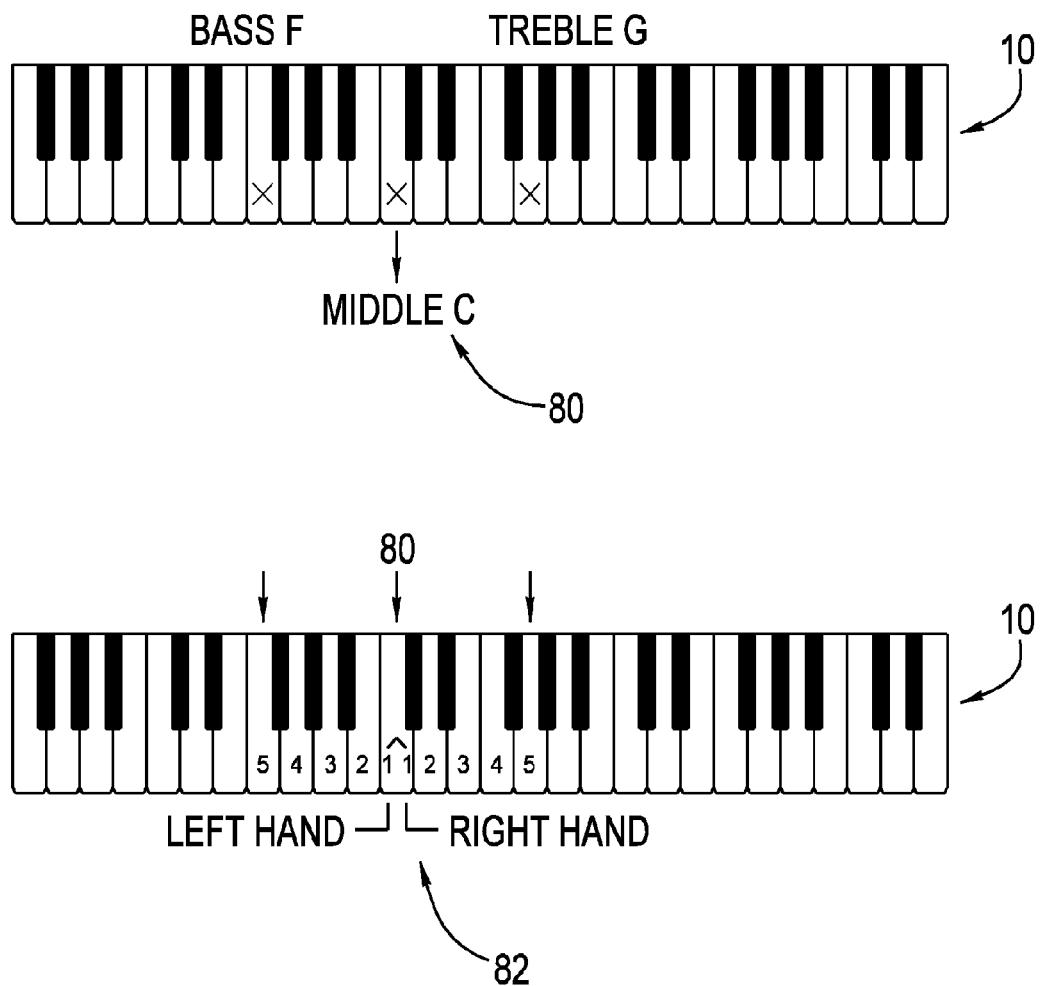
FIGS. 22 and 23 illustrate starting points on a portion of a keyboard instrument and a student's hands applied thereto.

Logistics: Have the student seated at the keyboard and turn to FIG. 22.

Objective: Finding our three starting points on the keyboard.

Teacher instructs Student: Middle C is the white key 80 just to the left of the set of two-blacks closest to the center of the keyboard 10. Please find Middle C on the keyboard. Now, as shown at 82, put both of your thumbs on the Middle C key 80. Your thumbs are sharing Middle C. Play Middle C with both thumbs and "walk out" by playing your "twos" (fingers labeled 2 in FIG. 21) in both hands, your "threes" in both hands, your "fours" in both hands and then your "fives" in both hands. Your fingers are moving in contrary motion. Your right hand has landed on the note Treble G and your left hand has landed on the note Bass F!! You now know how our three starting points look on the score and how to find them on the keyboard. You also know how to determine the distance (e.g., the interval) from one note to the next note. So, essentially, you can find any note on the keyboard from the music score.

Figure 23:
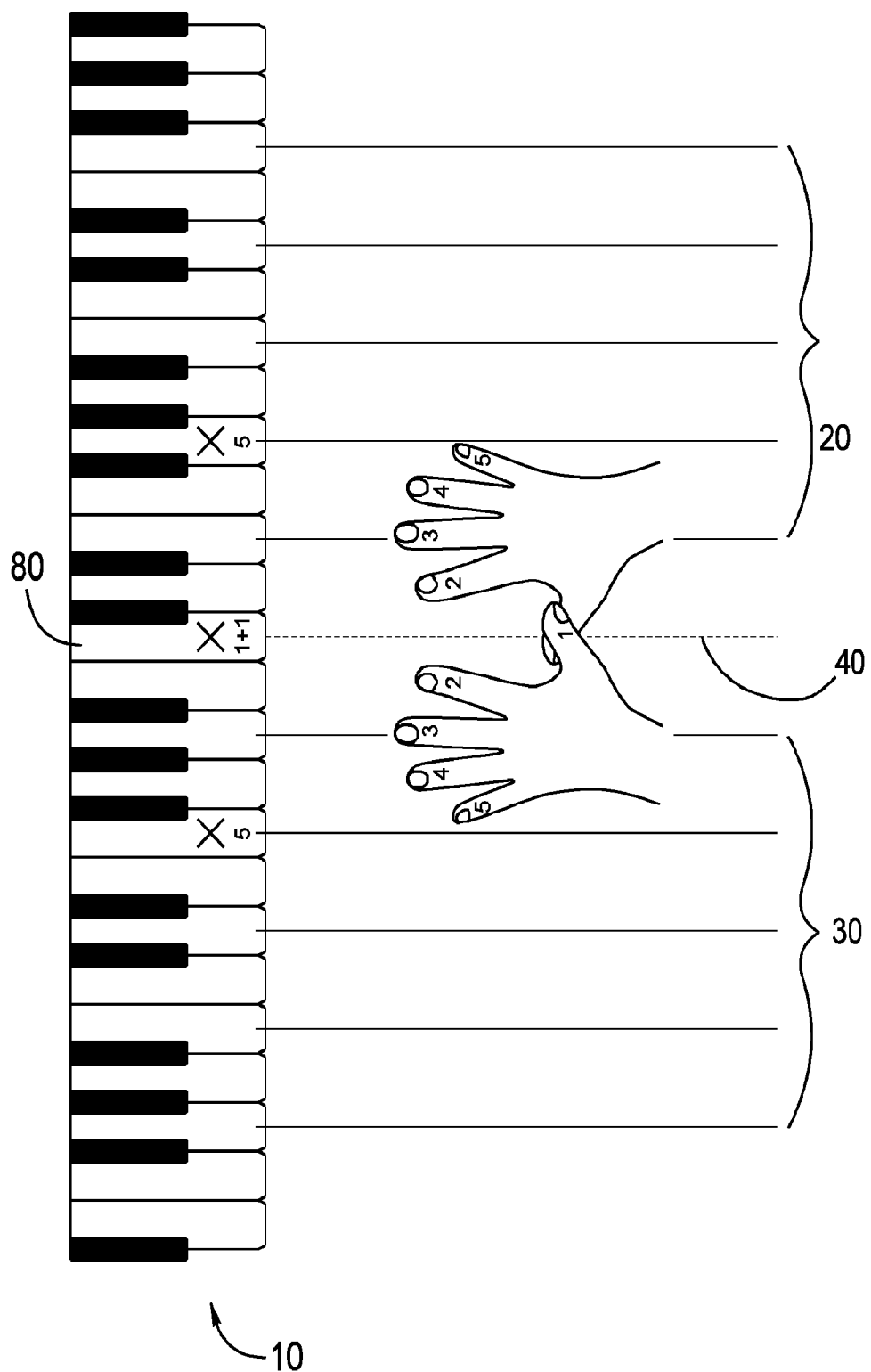
Figure 24:
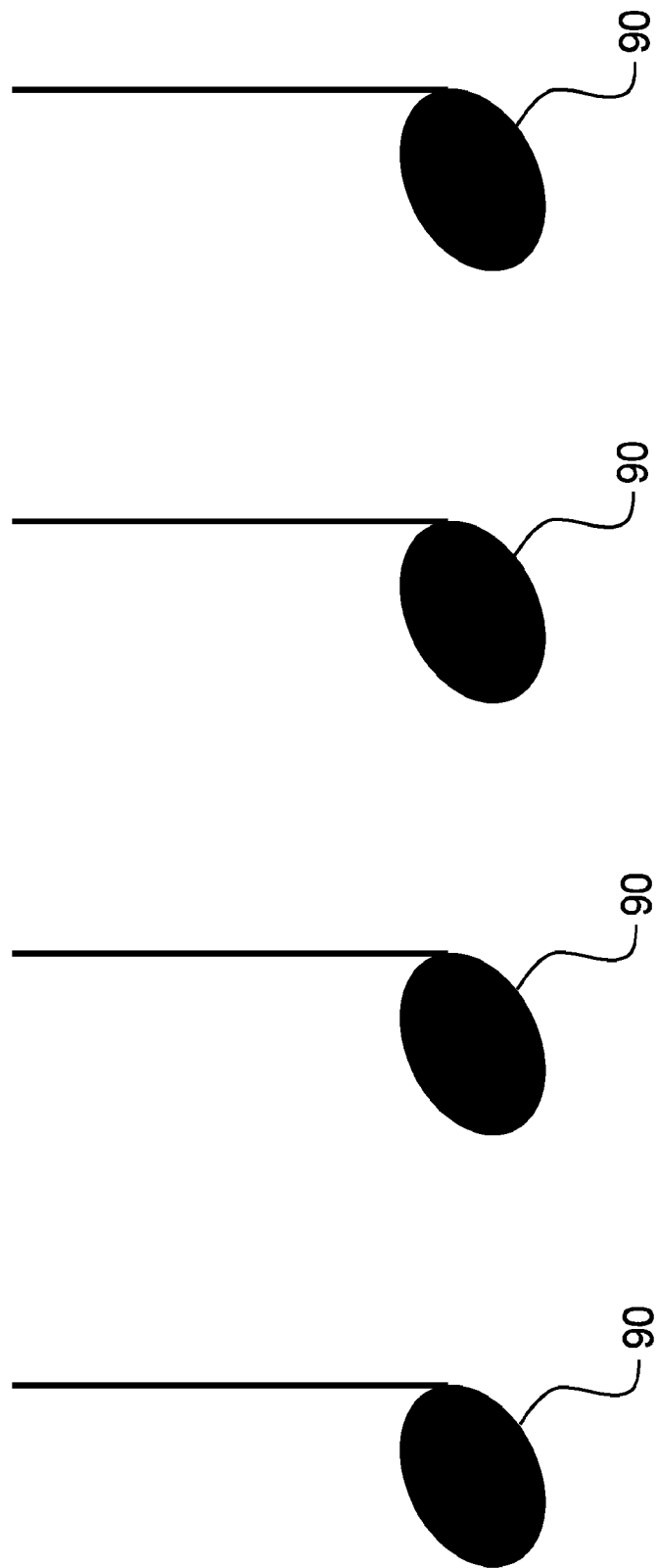
FIGS. 24-35 depicts a plurality of musical notes and means for applying rhythm thereto.

Teacher displays FIG. 23. Here you see the keyboard 10 superimposed vertically to our horizontal lines 20, 30, and 40. Notice that each line and each space correspond to a white key. Notice also that as we mate the Imaginary Line 40 to Middle C key 80 (just to the left of the centermost set of 2 black keys on the keyboard), Treble G and Bass F also mate with their corresponding white keys! Now take FIG. 23 and rotate the figure and, thus, the horizontal lines 20, 30 and 40 of our grand staff, ninety degrees)(90° to the right. The lines 20, 30 and 40 are now vertical, which at the same time presents the keyboard 10 in its normal horizontal fashion. This 90° degree rotation is the foundation for the forthcoming description of a related way to read the musical score.

Logistics: Return to the table to review rhythm flash cards presented in FIGS. 24-35.

Objective: Understanding and applying rhythm as it appears on the score.

Teacher instructs Student: A note 90 (circle filled with black) with line attached to it (a stem) gets "one count." In FIG. 24, we see four (4) of notes 90 in succession. Clap your hands with a steady beat (like you're marching), four times.

Figure 25:
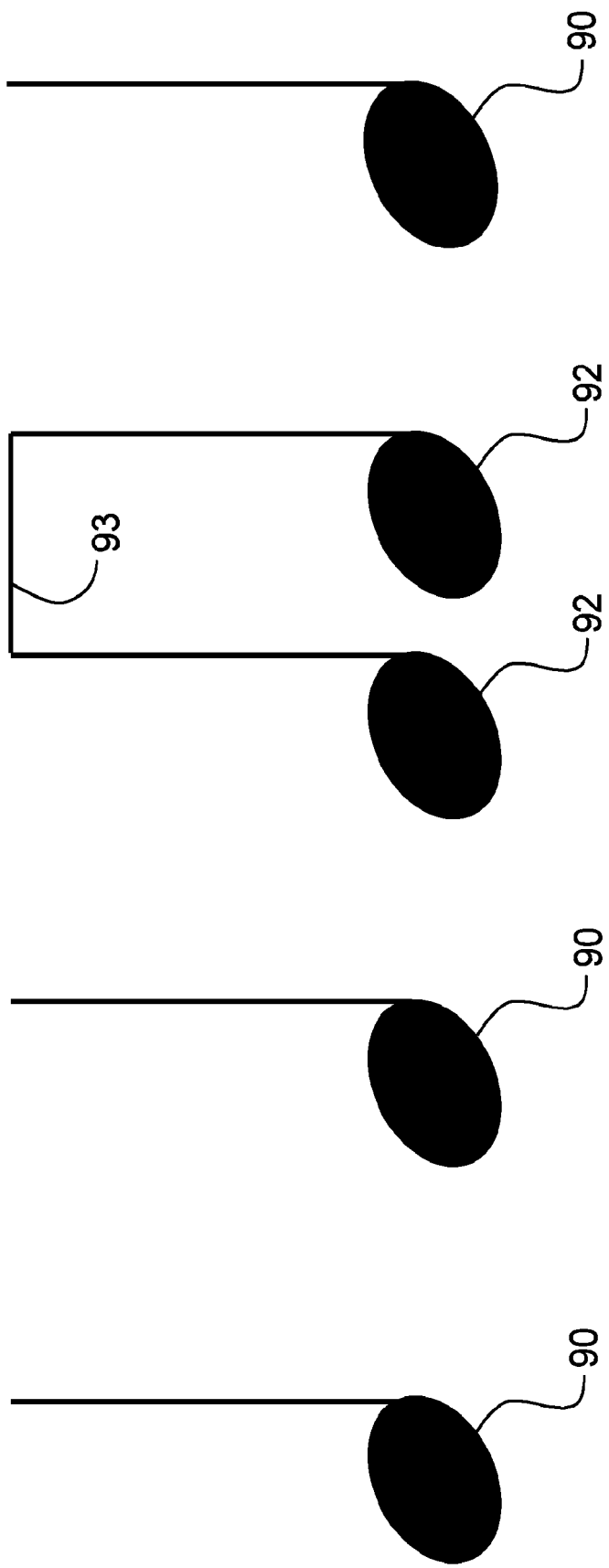
Figure 26:
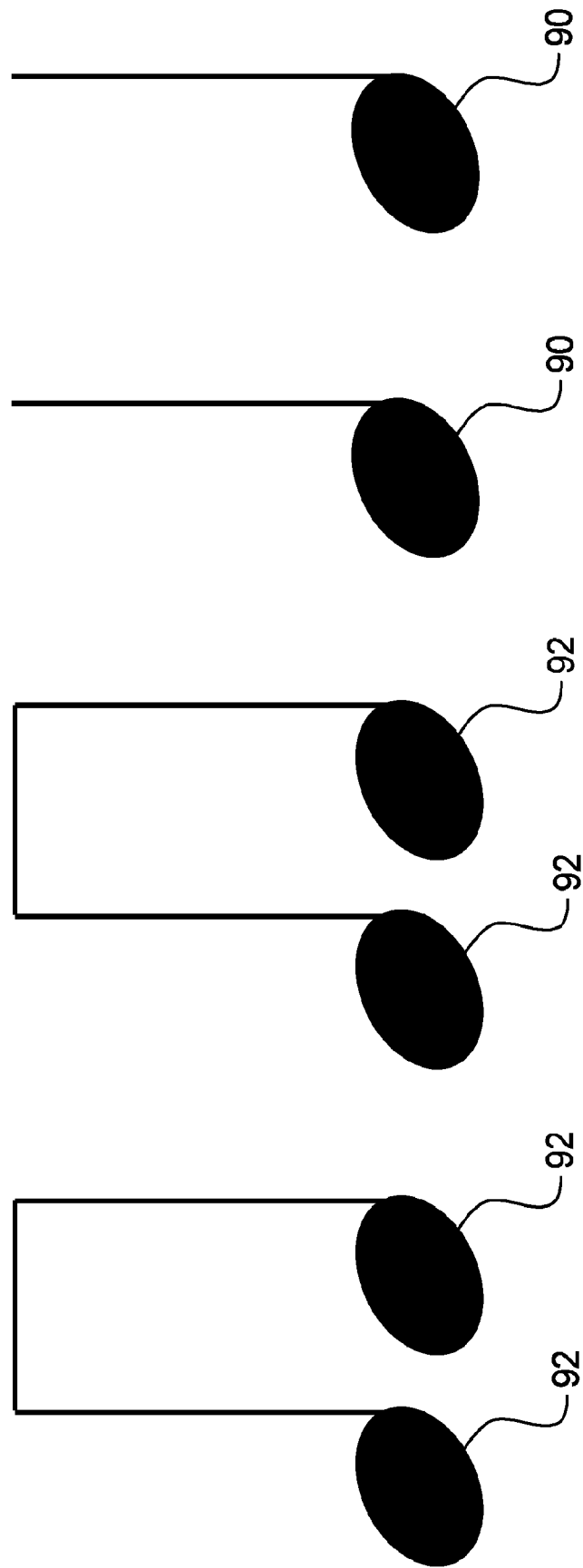
Figure 27:
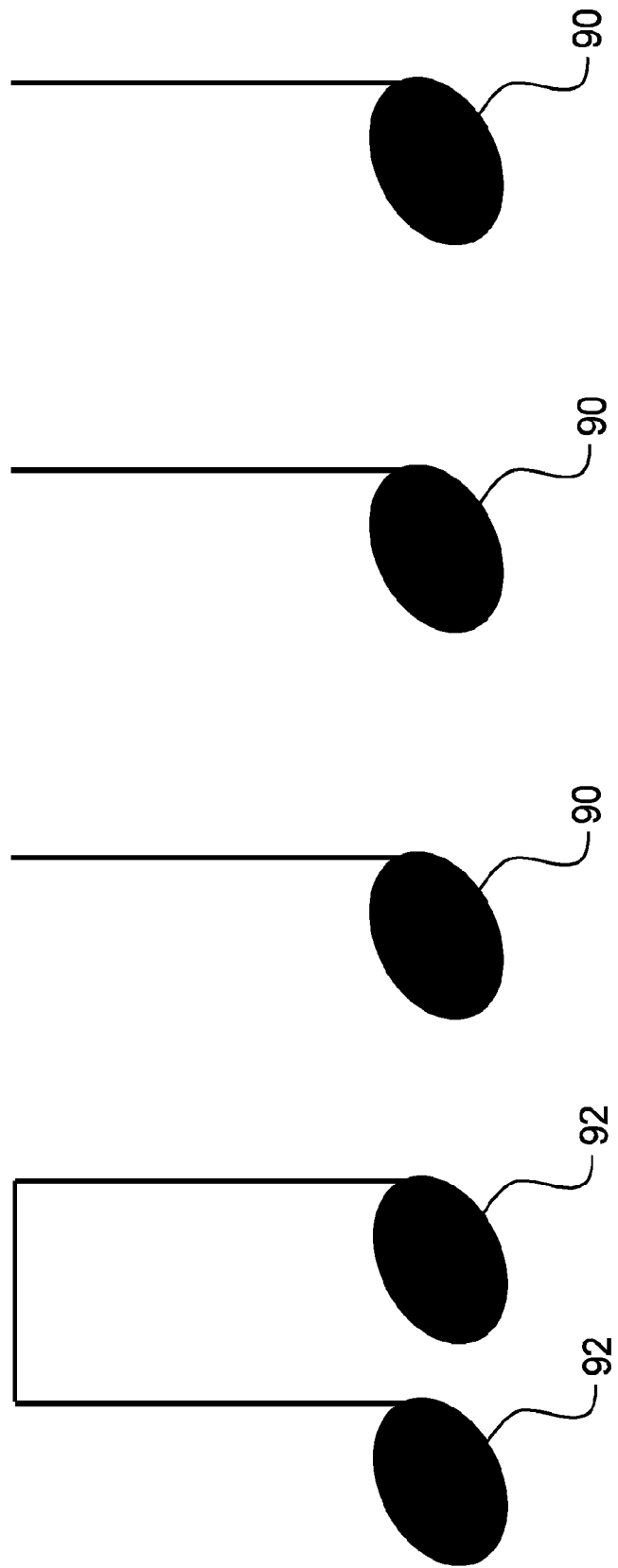
Figure 28:
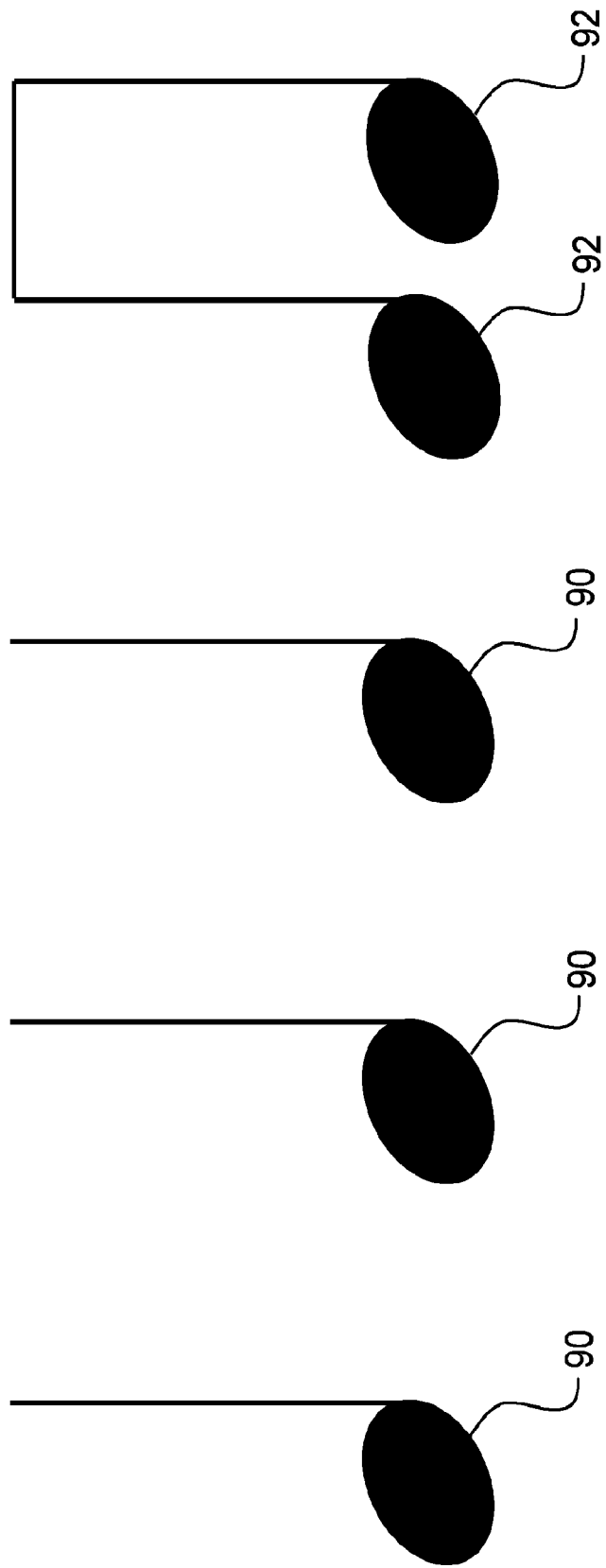
Figure 29:
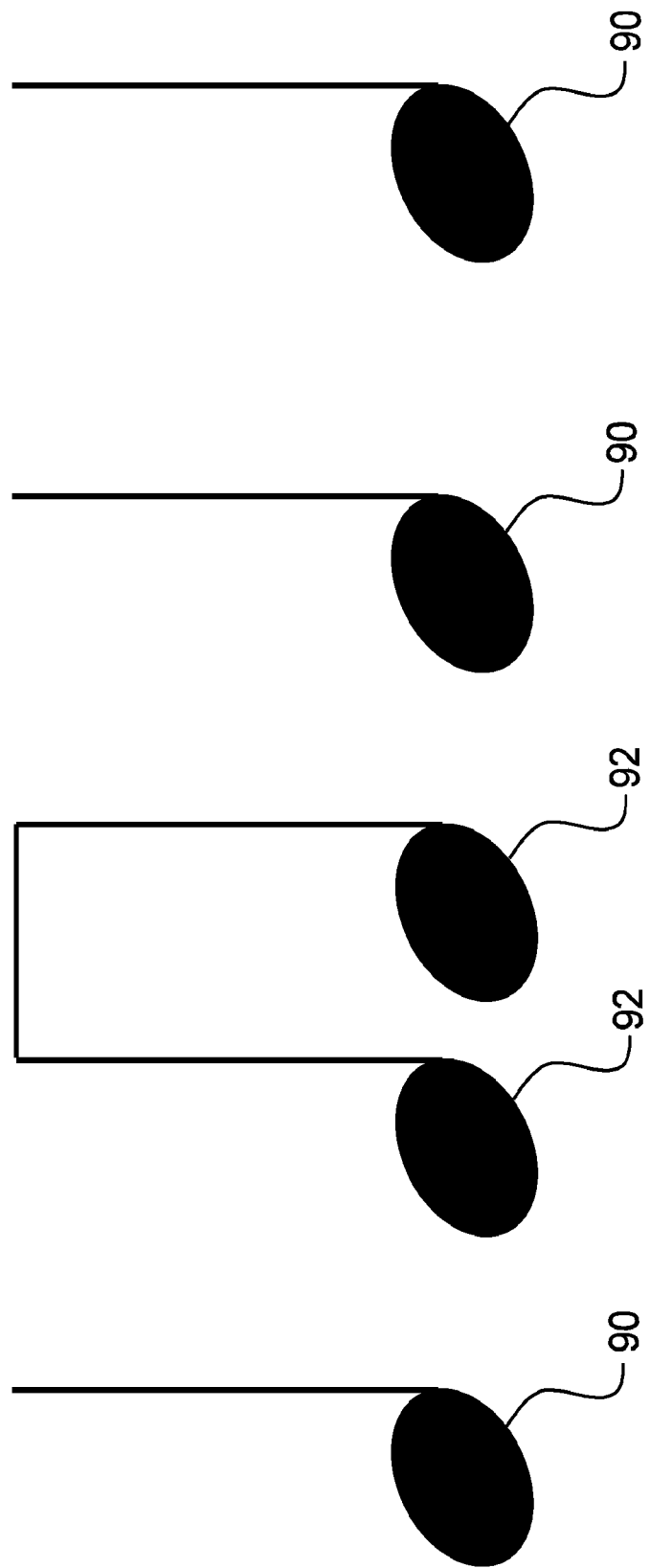
Figure 30:
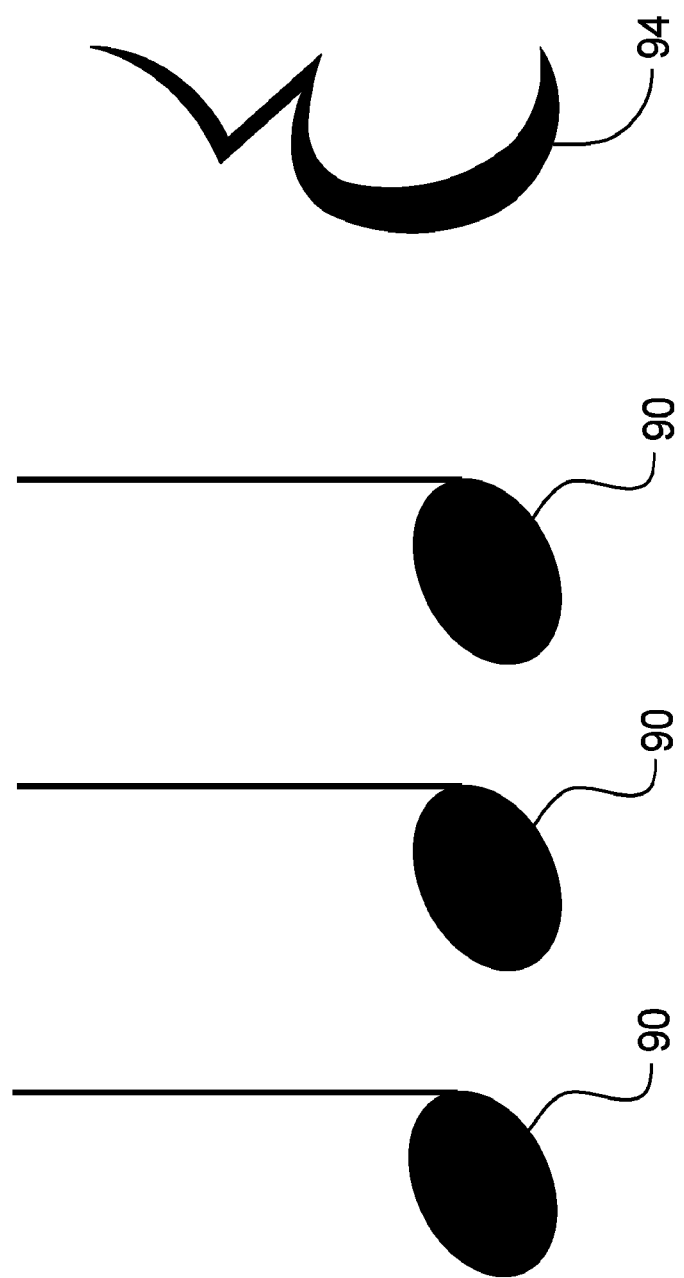
Figure 31:
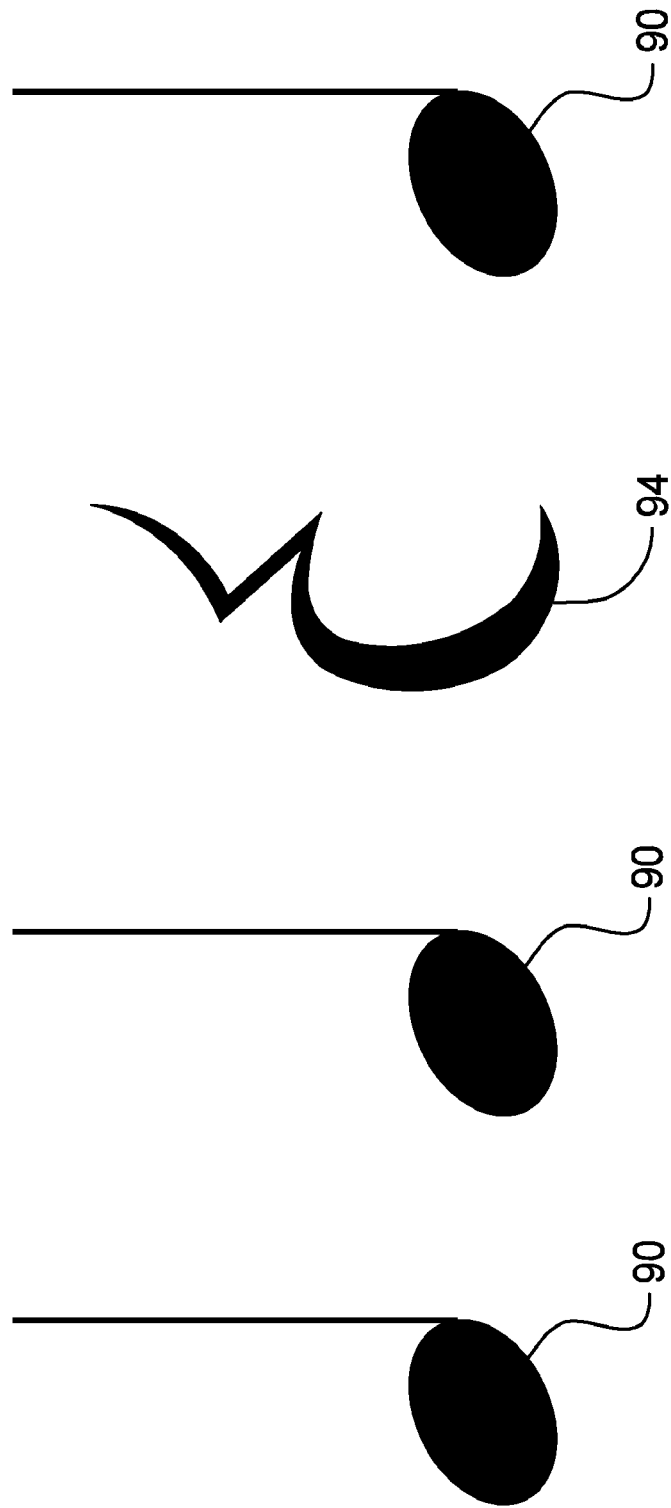
Figure 32:
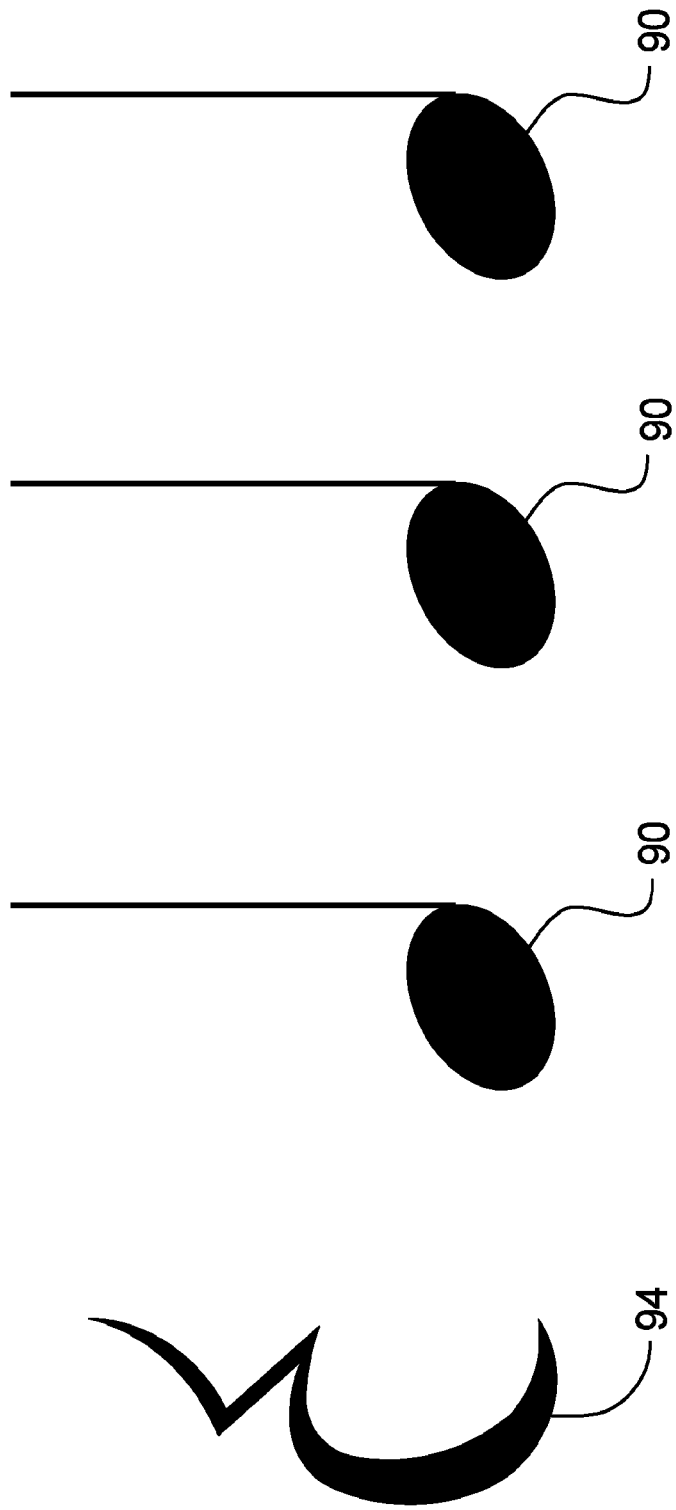
Figure 33:
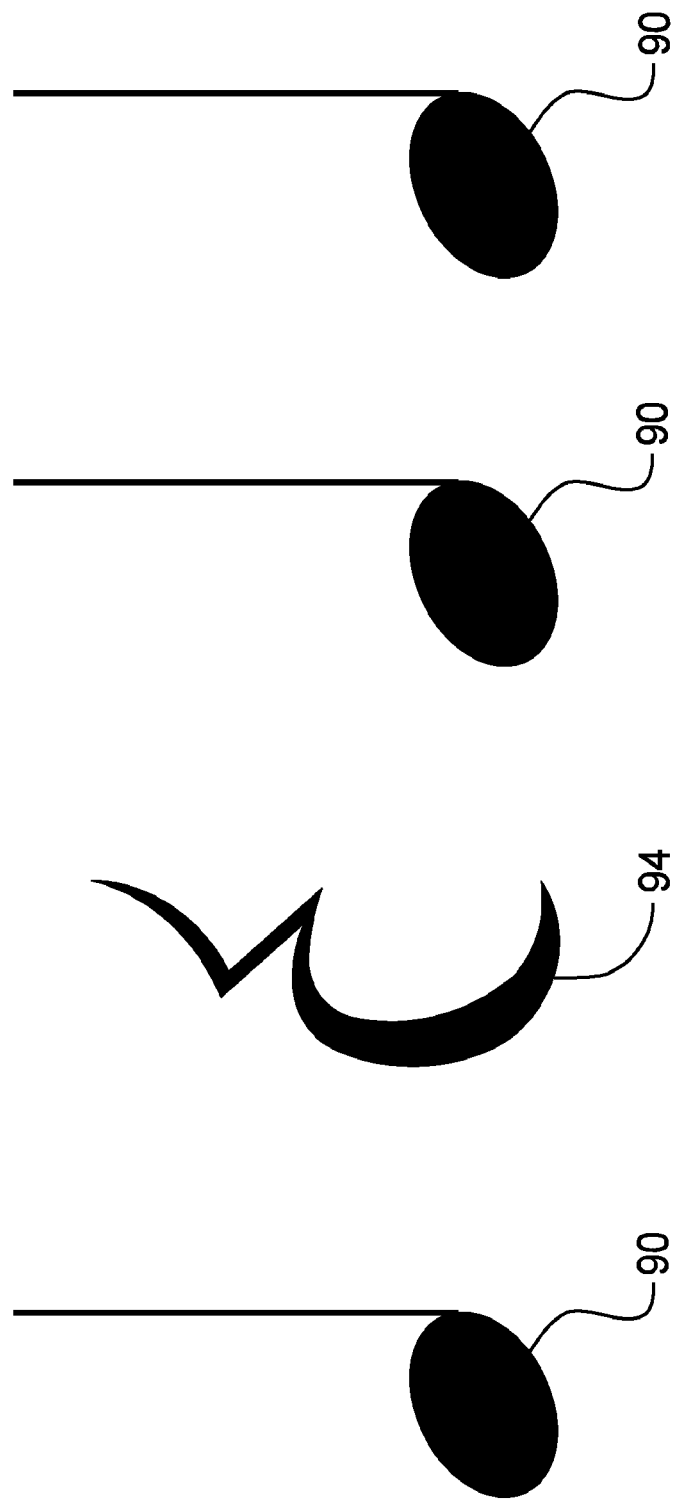
Figure 34:
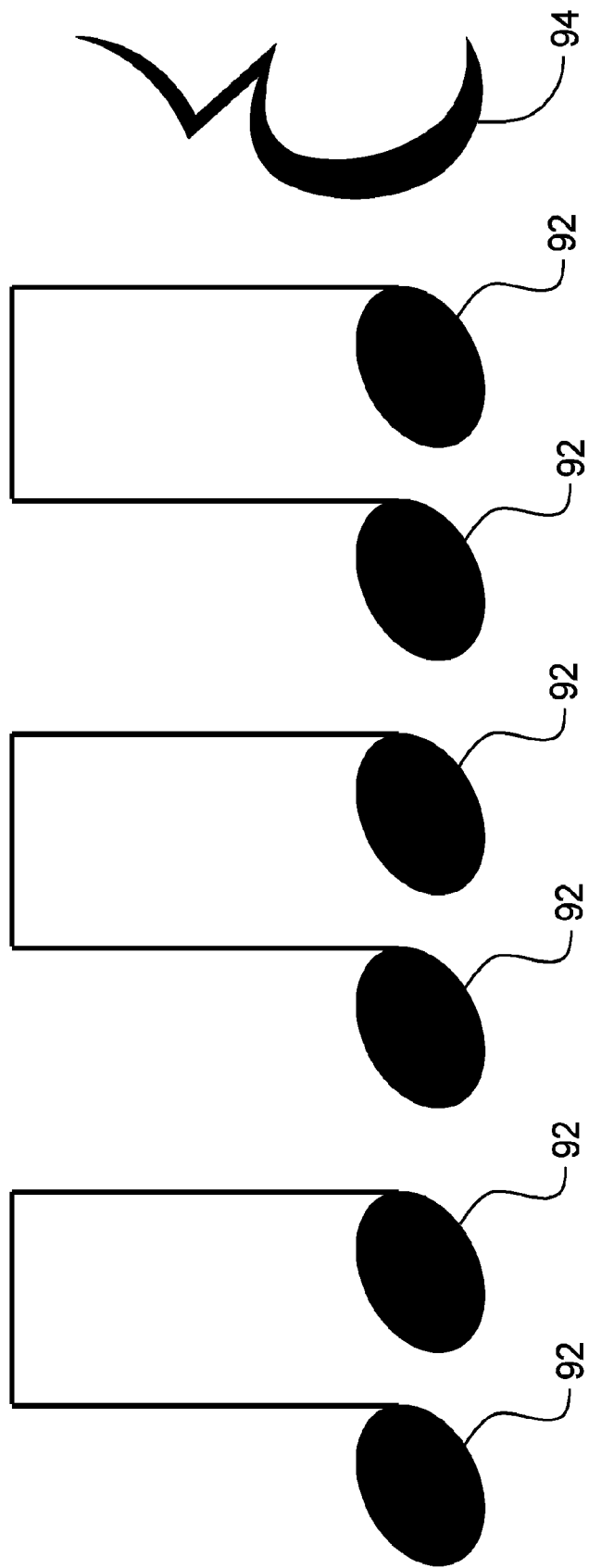
Figure 35:
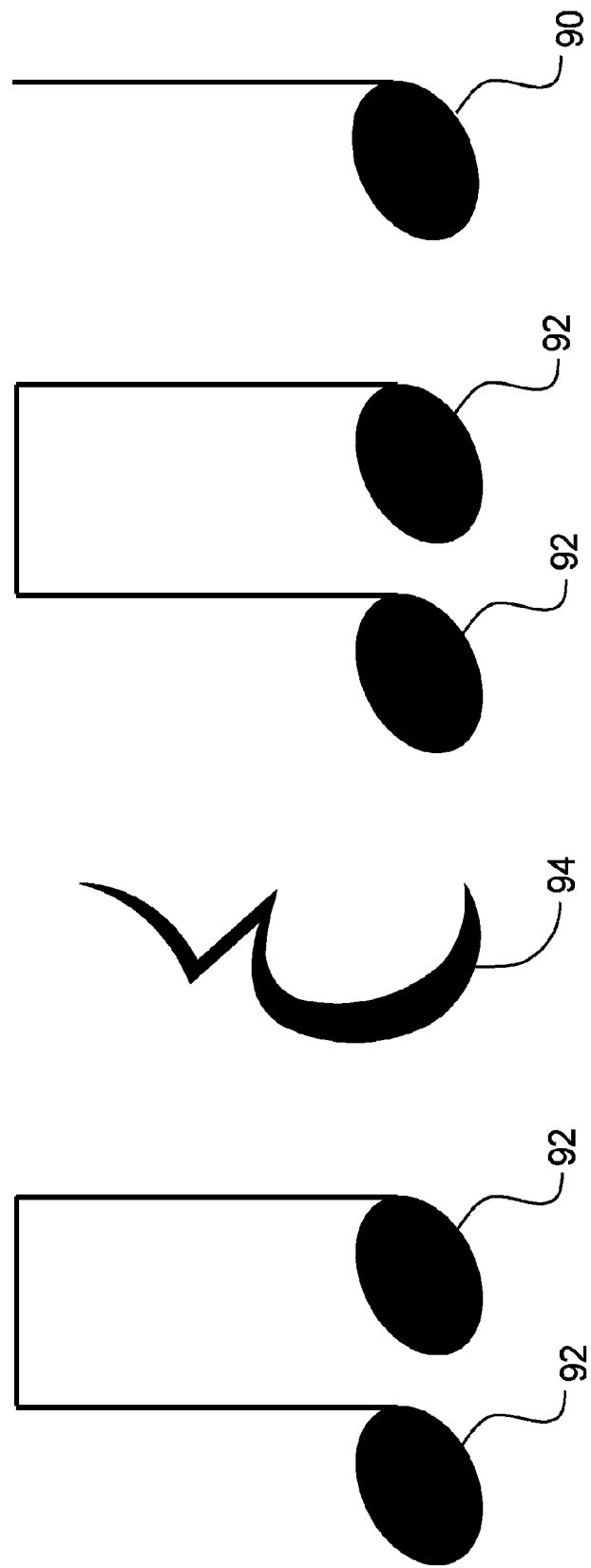

Your beat can be fast or slow, but it must be steady. In FIG. 25, some notes 90 as above, and we also see two notes 92 that are "married" or connected with a horizontal bar 93. This means these two notes 92 share one count. Each of these connected notes 92 is valued at exactly half of a full count. A good analogy is to think about a marching band that shouts, "Left, Left, Left-Right, Left." The "left-right" part is exactly how the married/connected notes 92 sound in relation to the notes that receive a full count. In fact, that is precisely how FIG. 25 should sound as you clap your hands to the beats. For FIGS. 26-29, clap out the beats for the illustrated notes 90 and 92. In FIG. 30, we see a new symbol 94 called a "rest." A rest 94 is silent, and it has value of one count. For FIGS. 30-35, clap out the beats for the notes 90 and 92 and the rest 94.

As illustrated above, one aspect of the present invention includes an interactive teacher-student instructional method where the teacher guides the student through a one-on-one, step-by-step learning process. While described within the context of a one-on-one instructional environment, it is within the scope of the present invention for the teacher and/or teachers to instruct two or more students. In another aspect of the present invention, the role of the teacher may be replaced or supplemented by an electronic teaching device. Generally speaking, the electronic teaching device includes one or more components operable to compute, classify, process, transmit, receive, retrieve, originate, switch, store, display, detect, record, reproduce, handle, or utilize any form of information, intelligence, or data for purposes of implementing one or more features and functions of the present invention. In one embodiment, for example, the electronic teaching device may be a standalone or networked computer, a portable computing device such as a laptop, a personal digital assistant (PDA), a mobile communication device having processing capabilities, or any other suitable processing device. The electronic teaching device includes memory, one or more processing resources such as a central processing unit (CPU) or hardware or software control logic. Additional components of the electronic teaching device include, for example, one or more storage devices, one or more communications ports for communicating with external devices as well as various input and output (I/O) devices such as, for example, a keyboard, a mouse, light pen or other pointing device, and a video display. As is well known in the art, the teaching device may also include one or more buses operable to transmit communications between the various hardware components.

Figure 36:
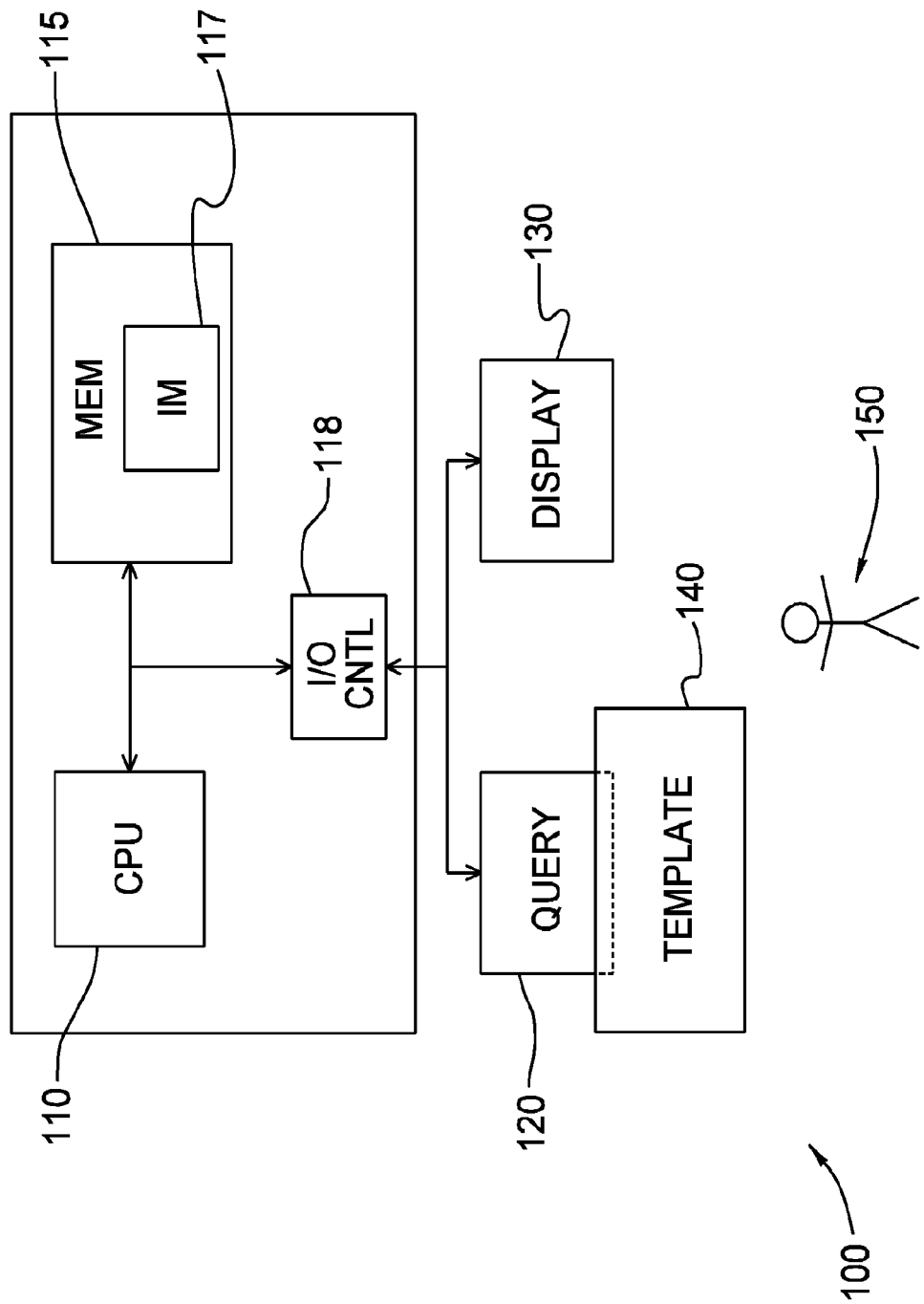
FIG. 36 is a block diagram illustrating a game system in accordance with one embodiment of the present invention.

In one embodiment, the electronic teaching device is implemented within a game system 100 depicted in block diagram form in FIG. 36. As shown in FIG. 36, the game system 100 includes a CPU 110 having hardware or software logic for invoking the musical notation reading and instrument playing instructional methods (IM) 117 of the present invention stored in memory 115, input/output controller 118 directing an input device 120 and a display device 130, and a template 140. In short, the musical notation reading and instrument playing instructional methods (IM) 117 encode the process described above with respect to the teacher-student instructional environment. Moreover, the input device 120, the display 130 and the template 140 cooperate to provide a student/player 150 the look and feel of playing a musical instrument. In one embodiment, for example, the template 140 is an overlay that is placed over the input device 120 (e.g., a QWERTY type computer keyboard) such that the input device 120 appears to be a portion of an instrument's keyboard, e.g., keys of a piano keyboard such as the keyboard 10 as described above.

It should be appreciated that in one embodiment, the game system 100 is implemented on a computer system such as a personal computer that is operated to perform as the electronic teaching device and, in another embodiment, the game system 100 is implemented as a game console of an entertainment system. Independent of implementation, it should also be appreciated that the game system 100 provides an interactive learning experience (e.g., by invoking the instructional methods (IM)) such that the student/player 150 interacts with the system 100 and is taught the rules and format of musical notation while also learning to play an instrument of choice.

It should be appreciated that the instructional methods (IM) employed within the game system 100 are on a completely different and much higher plane than conventional music learning tools, typically marketed as "music" video games. Existing music video games are seen to focus only on the eye/hand/tactile experience of the student/player. Some of these games such as, for example, GUITAR HERO® by Activision Publishing, Inc. (Guitar Hero is a registered trademark of Activision Publishing, Inc., Santa Monica, Calif. USA), which may be enormously popular, are fun and entertaining. However, not one of these popular games teaches the student/player to play an actual musical instrument nor do they teach the student/player how to read music notation. They are purely rhythmic games.

The instructional methods (IM) 117 employed within the game system 100 have been a fulfillment of a life-long dream of the inventor to introduce music to those who have not yet experienced the joys and sense of enrichment that music in general can add to one's life. The instructional methods (IM) are borne out of the inventor's unrelenting desire and drive to provide the key to uncovering the seemingly mysterious notion of reading music notation and playing an instrument in a fun, engaging, effective, and remarkably fast way.

The audience (e.g., students and players) for the game system 100 spans the full spectrum of people who have never learned to read music, who have forgotten how to read music, who are convinced they won't be able to read music, who have been told they have no musical ability, who think they're too young to learn to read music, who think they're too old to learn to read music, who play but want to improve their sight reading skills and especially those who want to play an instrument and read music, today.

Music is a universal language. This truth is fostered by the instructional methods (IM) 117 employed within the game system 100 as the structure of the game paves the way for participatory, engaging learning between one, two or any number of individuals anywhere in the world to come together in a communal way to share the joys of music.

One of the biggest perceived challenges in learning to play a musical instrument such as, for example, the piano, is often the sense of loneliness that goes along with it. For the most part, playing certain musical instruments has been a one-person activity. That is, until now. In portable form, a student/player 150 can play the game system 100 virtually anywhere. Moreover, the use of certain output devices such as, for example, headphones operatively coupled to the game system 100, precludes distracting others in the vicinity.

The inventor has found that the instructional methods (IM) 117 employed within the game system 100 are the most innovative, compelling instructional game to date. The game system 100 is suitable for virtually any individual in the world age five (5) and up.

With the instructional methods (IM) 117 employed within the game system 100, student/players 150 are able to: (1) play keyboard right away; (2) read music right away; (3) go to any keyboard and play; (4) go to any keyboard and read music (with or without the score); (5) play and learn keyboard on their own; and (6) play and learn with others.

Once exposed to the instructional methods (IM) 117 employed within the game system 100, the student/players 150 will, in effect, metamorphose into a true keyboard player who can also read music. In one embodiment, the instructional methods (IM) employed within the game system 100 can partner with existing console games such as, for example, Xbox 360, PS2, PS3, Nintendo Wii, RockBand, etc. However, preferably, the instructional methods (IM) 117 employed within the game system 100 can be the basis for a new console game where the keyboard is the primary instrument and other instruments (peripherals) can be added on an as-selected basis.

Figure 37:
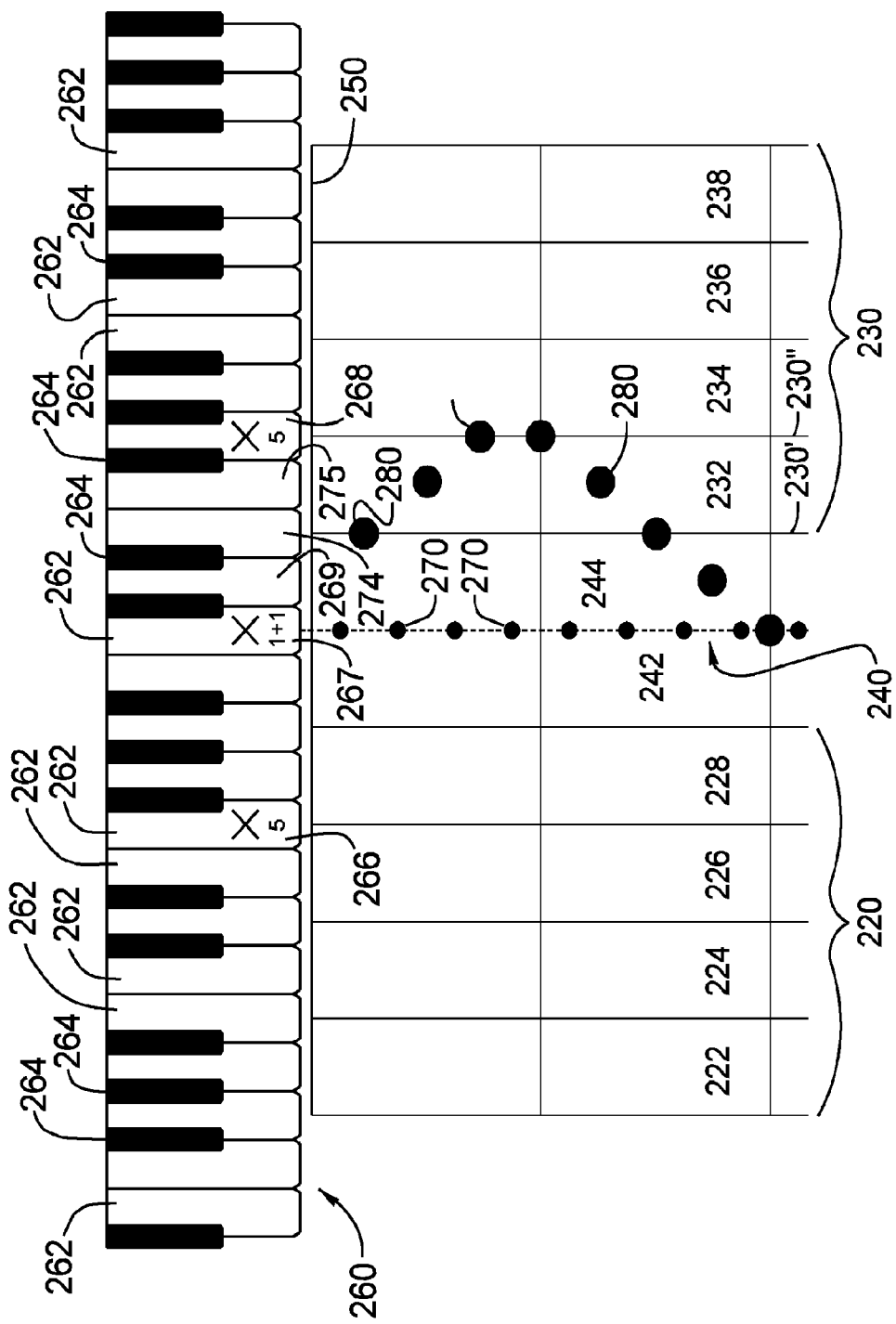
FIGS. 37-40 depict various screens of a game display presented by the game system of FIG. 36 to players, in accordance with one embodiment of the present invention.

As shown in FIG. 37, the instructional methods (IM) 117 employed within the game system 100 present the student/players 150 a game display 200 (on the display device 130) including, visually, two sets of five (5) parallel vertical lines 220 and 230, with a dashed parallel vertical line 240 between them. The lines 220, 230 and 240 (including the dashed line) are equidistant, with each of the areas between each line considered a space, for example, spaces 222, 224, 226, 228, 232, 234, 236, 238, 242 and 244, respectively, are shown. One black horizontal line 250 crosses all vertical lines 220, 230 and 240 at a top of the vertical lines 220, 230 and 240. A keyboard graphic 260 illustrating, for example, approximately three (3) octaves of a keyboard instrument, rests horizontally, just above the horizontal line 250 and on top of the vertical lines 220, 230 and 240. On the keyboard graphic 260, there is a key 266 labeled "X" on the note Bass F, a key 267 labeled "1+1" on the note Middle C, and a key 268 labeled "X" on the note Treble G. White keys 262 on the keyboard graphic 260 are directly correlated spatially to the vertical lines 220, 230 and 240 and spaces 222-228, 232-238, 242 and 244, with each line and each space corresponding to a separate white key. Black keys 264 are also provided on the keyboard graphic 260 to complete the representation of the keyboard instrument.

In one embodiment, graphic elements such as dots 270, which may be presented as red dots, represent rhythm and function like a metronome. The dots 270 travel up the dashed line 240 in an equidistant manner. In an entry level of play of the game 100 system, Level 1, a red dot 270 takes the form of a red horizontal line 272 crossing all vertical lines on a consistent basis (e.g., once every six (6) dots 270), the purpose of which is to minimize visual chaos on the game display 200. Graphic elements such as larger black solid circles 280 represent notes of the score to be played and travel up (e.g., as streamlined vertically up) the game display 200 on one of the lines 220 and 230, the dashed line 240 or a space 222-228, 232-238, 242 and 244. From time to time, symbols such as for example, "#" representing a sharp, or "♭" representing a flat may be inserted inside the black solid circles 280 or "notes." The symbols instruct the student/player 150 to strike a black key 264 immediately to the right or left, respectively, of the white key 262 they would otherwise depress. It should be appreciated that while notes are described above as being represented by circle graphical elements 280, it is within the scope of the present invention to employ any graphical form such as a symbol or character of interest, for example, a fictional character like a monster, an alien, a cartoon image of an animal, a pirate, a wizard or witch, mad scientist, action figure, prince or princess, as well as actual or fictional characters such as an athlete, musician, actor or actress, performer, or like characters of interest to children, adolescents and/or adults. Further, the game display 200 may include a character-based theme such as, for example, music, sports or other entertainment based theme.

Figure 41:
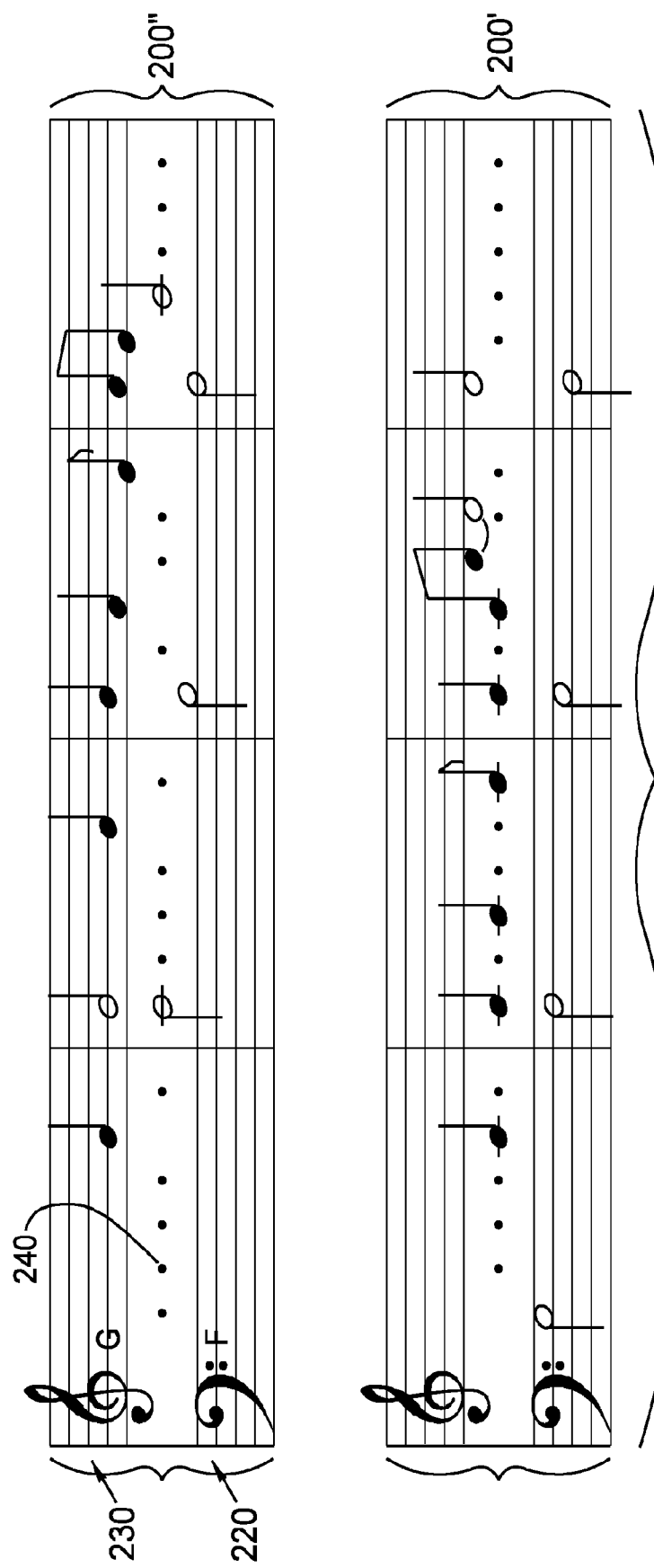
FIG. 41 depicts various screens of the game display presented to an advanced player of the game system of FIG. 36.

In advanced levels of play of the game system 100, Levels 2 and 3, some of the larger black solid circles 280 take on a more traditional "note look" reflecting standard music notation. For example, as shown in FIG. 41, Level 2 representations 200' and 200" of a musical piece, the duration of the notes may be differentiated with hollow circles, stems, dots, ties, and the like, as are generally known in music notation. Clefs may be introduced indicating a range of pitches, and ledger lines may be introduced indicating pitches outside the aforementioned range. Key signatures may be introduced, which indicate which notes will be consistently sharp or flat (although not always a black key, as before), and time signatures may be introduced, which group certain numbers of beats together and are then separated with bar lines. It should be appreciated that in a Level 3, the representations 200' and 200" illustrated in FIG. 41 are rotated ninety degrees (90°) to the left and presented to the student/player in standard music notation orientation.

In one embodiment, the instructional methods (IM) 117 employed within the game system 100 instruct the entry-level player to find the white key 262 on the keyboard graphic 260 that corresponds to the dotted vertical line 240. This particular white key 267, called "Middle C," can be found just to the left of the set of 2-black keys 264 centermost on the keyboard graphic 260 and is the first "starting point."

As one of the keys 262 and 264 is depressed, the corresponding key on the graphic keyboard display 260 turns, for example, a shade of grey indicating play. This allows the student/player 150 to keep track visually of which key they pressed and whether it correctly matches up with the large black circles 280 (the notes) that are moving up the game display 200—without the risk of losing valuable time looking down at their hands and thereafter back up to the game display 200 in preparation for a next oncoming note.

Here is at least one secret to the instructional methods (IM) 117 employed within the game system 100: Each note on a LINE 220, 230, 240 and each note on a SPACE 222-228, 232-238, 242, and 244 corresponds to a WHITE KEY 262 on the keyboard graphic 260.

For example, the IM 117 instructs the student/player 150 to:

1. Using the right hand, press Middle C (key 267) with the thumb, which corresponds to the vertical dashed LINE 240 (in the center of the 2 sets of 5 vertical lines 220 and 230).

2. Using the index/pointer finger, press the second ("next", "neighboring") white key 269 to the right. This key corresponds to the SPACE 244 to the right of the center dotted line 240.

3. Using the third finger, press the third ("next," "neighboring") key 274 to the right. This key corresponds to a first vertical solid line 230' of lines 230.

4. Using the ring finger, press the fourth neighboring white key 275 to the right. This key 275 corresponds to the space 232 to the right of our first vertical solid line 230'.

5. Using the pinky finger, press the fifth neighboring white key 268 to the right. This key 268 corresponds to a second solid line 230" of the lines 230.

The right hand pinky finger lands on a second "starting point" key, the key 268 called "Treble G."

Using the left hand in the above manner, it is quite simply a mirror image of what we have just reviewed, with respect to the right hand. The left hand pinky finger lands on a third "starting point" key 266 called "Bass F."

The concept above can be demonstrated in a visual manner in approximately one minute.

At the early entry level, the student/player 150 is reading and playing pieces comprising these nine (9) white keys (e.g., the keys between key 266 and key 268 on the keyboard graphic 260) right away, along with a few black keys. Reading music and playing white keys outside this range of nine (9) keys is simply a matter of figuring out how many spaces and lines (and in which direction) is indicated and finding the white key that corresponds to it in number and direction. Progress is very fast because the method makes sense.

In advanced Levels 2 and 3, some of the larger solid black circles 280 are hollow or contain a symbol within them. If the solid or hollow circle encompasses the symbol "#," the student/player 150, instead of striking the corresponding white key, depresses the black key closest to the right. If the solid or hollow circle encompasses the symbol "♭," the student/player 150 instead of striking the corresponding white key, depresses the black key closest to the left. In advanced games and even then very rarely, the student/player 150 strikes a white key closest to the right (for notes B and E) or strikes a white key closest to the left (for notes C and F).

Figure 38:
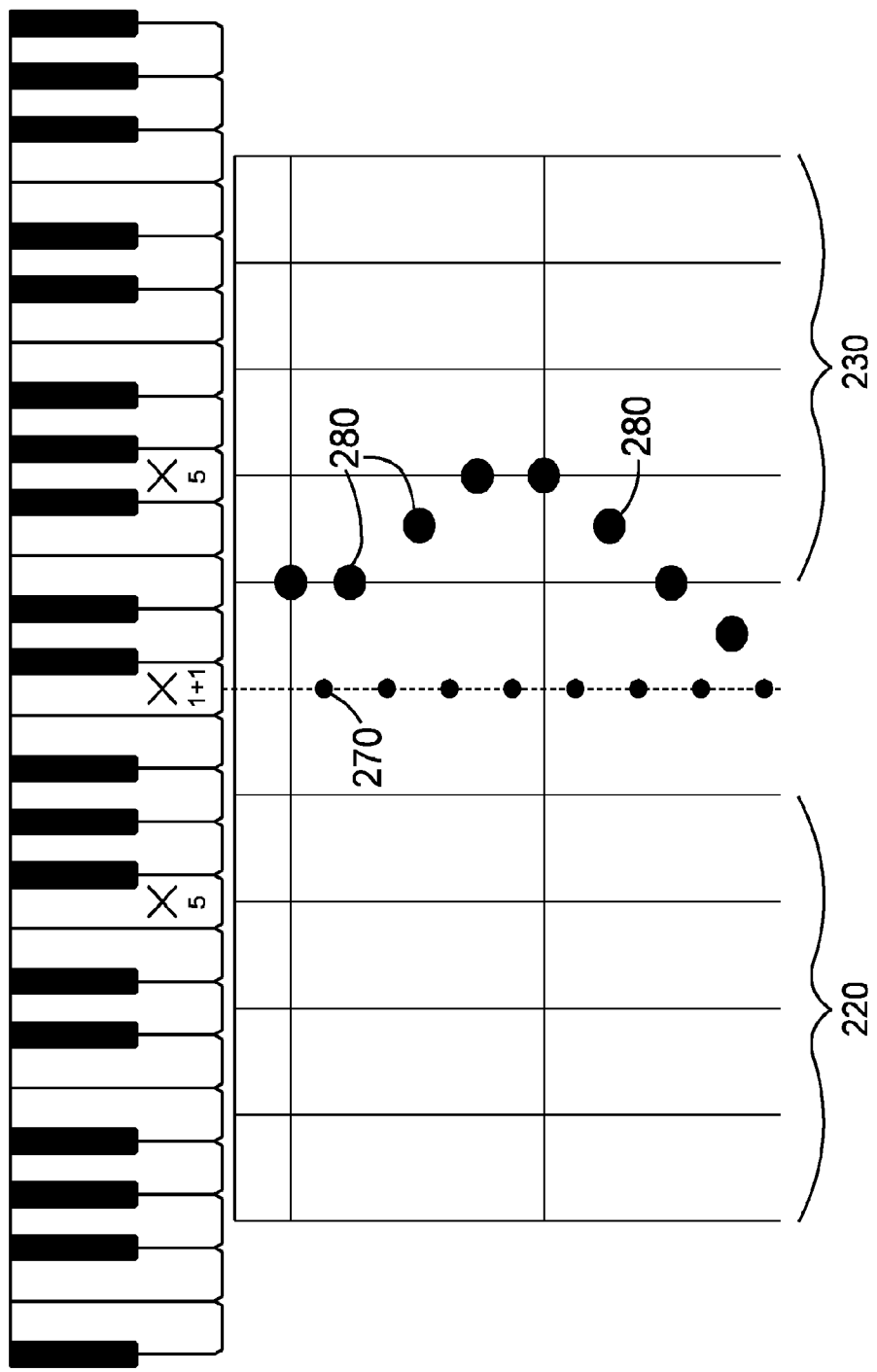
Figure 39:
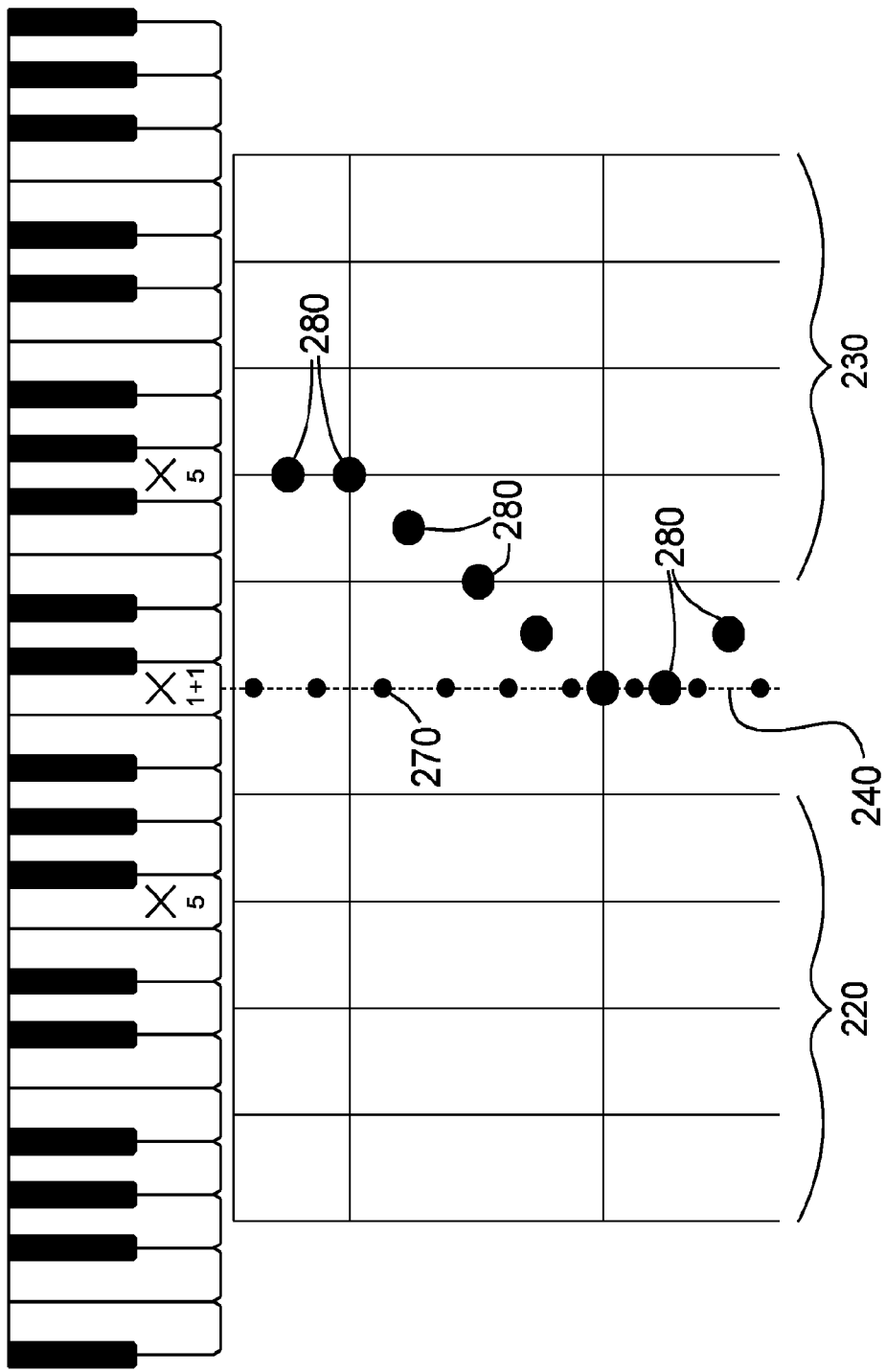
Figure 40:
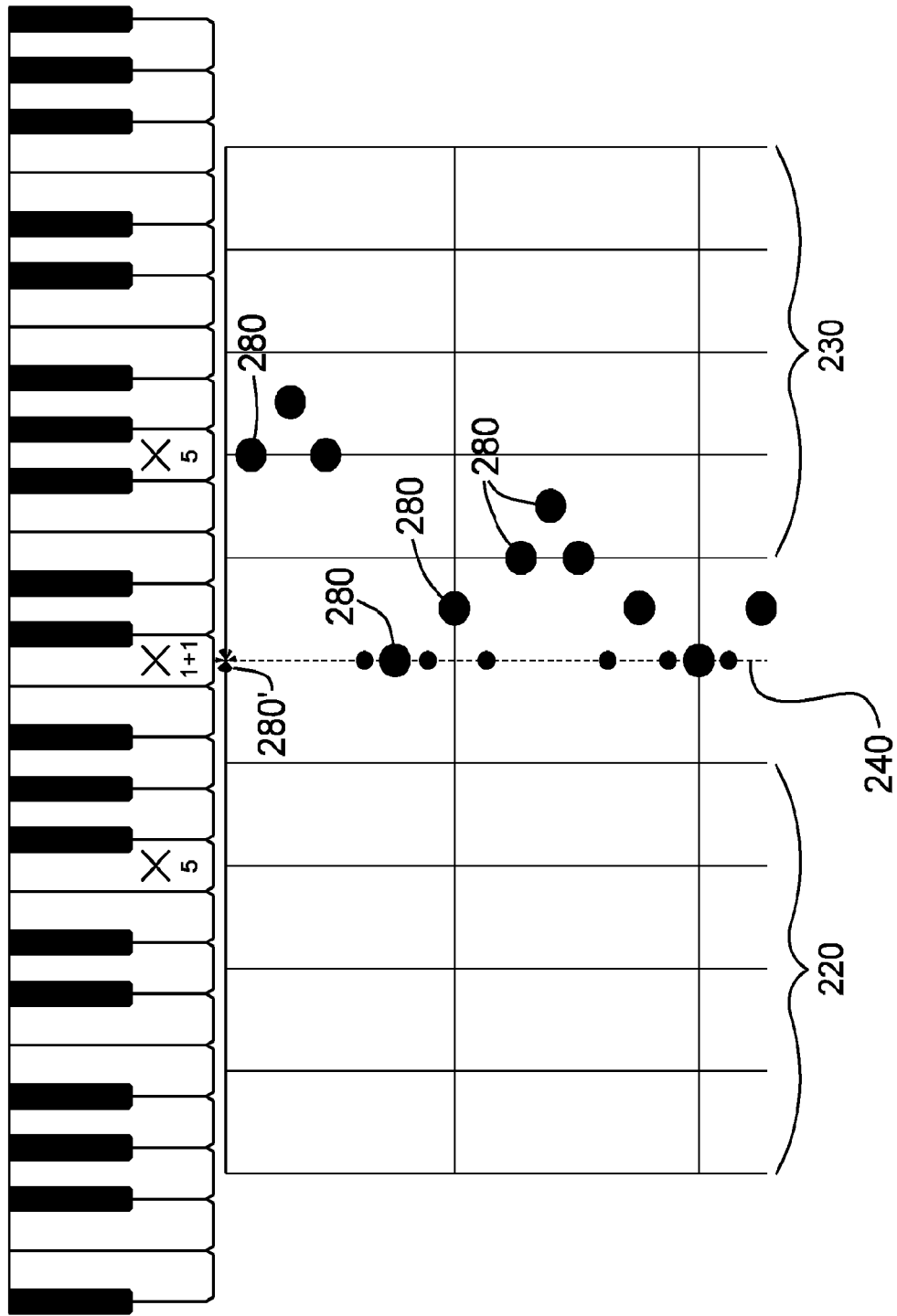

As shown in FIGS. 38-40, the red dots 270 and a consistently spaced red line move up the game display 200 in an equidistant manner. As noted above, one purpose of the red dots 270 are to assist the student/player 150 visually in knowing how long to wait before striking the next key (e.g., to indicate the rhythm of the music being played). The black solid circles 280 (notes) dispersed on the "Grand Staff" (the 2 sets of 5 solid lines 220 and 230 with the dashed line 240 between and dividing them) stream from the bottom of the game display 200 upward and the horizontal line 250 at the top of the vertical lines 220, 230 and 240 is the point at which the student/player 150 depresses the correct note, as indicated at 280' (FIG. 40).

As noted above, it is within the scope of the present invention to implement the instructional methods (IM) within a non-portable version and a portable version of the game system 100. In a non-portable embodiment, the game system 100 includes a keyboard comprising, for example, four (4) octaves or forty-nine (49) standard-sized keys including both black and white keys. There are other solutions such as a thirty-seven (37) key keyboard, a roll-up keyboard, and any number of other options depending on available technology. The keyboard may have two (2) removable and/or adjustable poles (legs) that are connected from the underside of the keyboard to boomerang-shaped feet for stability. The keyboard may have a key cover that slides down over the keys from a pocket in order to protect the keyboard during transit or re-location. The keyboard may have a handle affixed to it so that a student/player pick it up for travel purposes (the keyboard will then be in a vertical position, with the keys toward the floor). In one embodiment, a keyboard is designed and manufactured specifically for the present invention. Consideration can be given to the idea of a fold-up screen that lifts by hinge when the keyboard cover is opened. The screen would span the entire forty-nine (49) keys. In one embodiment, a pedal can accompany the keyboard for more advanced students/players.

In a portable embodiment, software downloaded onto a personal computer or laptop enables the depression of various computer keyboard keys (e.g., on the QWERTY keyboard) to correspond to various pitches. The aforementioned template 140 acts as a computer keyboard "cap" whose visual design is that of a piano keyboard. The template is affixed onto the computer keyboard. The template 140 may have a second layer on top of a bottom layer. The second layer would unfold from the center and open to reveal more piano keyboard keys. A similar concept can easily apply to handheld devices.

In one embodiment, each piece in the system 100 is assigned an Opus Number. Within each piece, there may be, for example, three (3) levels of difficulty. For example, the first, easiest piece progresses as follows: Opus One, Level 1; Opus One, Level 2; Opus One, Level 3. The three levels of difficulty are based on the following:

Level One: the melody of the piece. Both hands may be utilized to deliver the melody, but for the most part, one note is played at a time.

Level Two: add harmony to the piece. This means that in addition to the melody, additional notes are played (sometimes at the same time as the melody) to enhance the quality and sophistication of the piece. Visually, rhythm notation (note values) are added (stems, hollow notes, dots, ties, etc.)

Level Three: Similar to Level Two, but the vertical line schematic is rotated ninety degrees (90°) to the left to reflect the traditional reading of the musical score. Here, the notes move from right to left, approaching the now-vertical leftmost colored crossing line. Due to the addition of note values in Level Two, Level Three approaches standard musical notation.

A next piece is a bit more challenging and is classified as Opus Two, etc.

The student/player 150 need not move to Levels 2 and/or 3 if they choose not to. Instead the student/player may continue just playing melodies of pieces within the Level 1 range of difficulty.

At least one object of the instructional methods (IM) employed within the game system 100 is to have the student/player strike the correct key on the keyboard at the correct time. In one embodiment, the student/player earns points on, for example, a score board exhibited on the game display 200 based on the accuracy, timing and speed of the keys being struck during play. Scoring may also be influenced by the piece selected such as, by factoring in relative degree of difficulty (e.g., easy, moderate, advanced), the technical challenge within the piece, and the accuracy with which the student/player performs the piece. One or more student/players can compete to achieve a highest score. As can be appreciated, competition can be against oneself, or against other student/players.

As should be appreciated, the inventor contemplates applying the inventive systems and methods of learning to any and all musical instruments. Peripherals (other instruments) could connect to the main console (the keyboard) and the game display 200 may exhibit the music corresponding to that instrument so that a musical score including more than one instrument is performed. As such, the systems and methods of learning as described herein may be applied to any and all musical instruments, independently or cooperatively.

Accordingly, the instructional methods (IM) of the game system 100 as described herein have the capacity to revolutionize the way the general public worldwide reads music. The system meets virtually every demographic worldwide, from the age of five (5), with the exception of income, and contains every design element to capture the significant need now seen in the gaming and learning industries for a compelling solution to the next music gaming genre. As such, the instructional methods (IM) are poised to catapult the music gaming industry to new heights above and beyond the imagination of the gaming world. Unlike any other music game in the world, the present invention provides and stimulates a subconscious learning set of music reading skills to the student/player. In the end, people will be playing and reading music.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A system for instructing a player to read music notation and to play a keyboard instrument, the system comprising:
    a processing unit having memory and logic for invoking musical notation reading and keyboard instrument playing instructional methods stored in the memory;
    an interactive display device coupled to the processing unit, the display device presenting a graphical representation of at least a portion of the keyboard instrument having a plurality of white and black keys, and an odd number of parallel vertical lines spaced equidistantly;
    an input device coupled to the processing unit, the input device operable by the player of the system;
    a template coupled to the input device, the template relating the input device to the white and black keys of the keyboard instrument;
    wherein the processing unit is configured to:
        a) associate the vertical lines and spaces between the vertical lines with the white keys, each vertical line and each space corresponding to a separate white key;
        b) display a first graphical element on one of the vertical lines or one of the spaces on the graphical representation presented by the display device, the first graphical element representing a note and corresponding to one of the white keys;
        c) display second graphical elements on the middle vertical line to visually inform the player how long to wait before striking a next key, the second graphical elements representing a rhythm of a musical score being played;
        d) receive an input from the input device, the input corresponding to a white key selected by the player; and
        e) changing a color of the white key selected by the player on the display device; and
        repeat b)-e) by changing a location of the first graphical element displayed on the graphical representation or providing at least two first graphical elements to display.

2. The system of claim 1, wherein the graphical representation comprises eleven parallel vertical lines spaced equidistantly.

3. The system of claim 1, further comprising a third graphical element displayed on one of the vertical lines or on one of the spaces on the display device representing a sharp or flat note and corresponding to one of the black keys on the display device; and wherein the processing unit changes the color of the black key selected by the player on the display device.

4. The system of claim 3, wherein the processing unit streams a plurality of the first graphical elements on the display device, each first graphical element corresponding to a note of a musical score.

5. The system of claim 4, wherein the musical score has a varying degree of difficulty.

6. The system of claim 1, wherein the processing unit generates a score based on accuracy, timing and speed of the input received from the input device.

7. The system of claim 6, wherein the processing unit generates the score based on a difficulty of a musical score.

8. The system of claim 1, wherein the processing unit presents the middle vertical line visually different from other vertical lines on the display device.

9. The system of claim 8, wherein the processing unit displays horizontal lines across all of the vertical lines to visually inform the player how long to wait before striking a next key, the horizontal lines representing a rhythm of a musical score being played.

10. A computer based method for instructing a player to read music notation and to play a keyboard instrument, comprising the steps of:
    a) presenting a graphical representation comprising at least a portion of the keyboard instrument having a plurality of white and black keys, and an odd number of parallel vertical lines spaced equidistantly on a display device by a processing unit;
    b) associating the vertical lines and spaces between the vertical lines with the white keys by the processing unit, each vertical line and each space corresponding to a separate white key;
    c) displaying a first graphical element on one of the vertical lines or one of the spaces on the display device by the processing unit, the first graphical element representing a note and corresponding to one of the white keys on the display device;
    d) displaying second graphical elements on the middle vertical line to visually inform the player how long to wait before striking a next key, the second graphical elements representing a rhythm of a musical score being played;
    e) receiving an input from an input device by the processing unit, the input corresponding to a white key selected by the player; and
    f) changing a color of the white key selected by the player on the display device by the processing unit;
    g) repeating the steps c)-f) by the processing unit by changing a location of the first graphical element or displaying at least two first graphical elements.

11. The method of claim 10, further comprising the step of presenting the graphical representation comprising eleven parallel vertical lines spaced equidistantly on the display device.

12. The method of claim 10, further comprising the steps of:
    displaying a third graphical element on one of the vertical lines or on one of the spaces on the display device by the processing unit, the third graphical element representing a sharp or flat note and corresponding to one of the black keys on the display device; and
    changing the color of the black key selected by the player on the display device by the processing unit.

13. The method of claim 11, further comprising the step of streaming a plurality of the first graphical elements on the display device, each first graphical element corresponding to a note of a musical score.

14. The method of claim 13, wherein the musical score has a varying degree of difficulty by the processing unit.

15. The method of claim 10, further comprising the step of generating a score based on accuracy, timing and speed of the input received from the input device by the processing unit.

16. The method of claim 15, further comprising the step of generating the score based on a difficulty of a musical score.

17. The method of claim 10, further comprising the step of presenting the middle vertical line that is visually different from the other vertical lines.

18. The method of claim 17, further comprising the step of displaying horizontal lines across all of the vertical lines to visually inform the player how long to wait before striking a next key, the horizontal lines representing a rhythm of a musical score being played.

\* \* \* \* \*